(12) United States Patent
Kakumanu et al.

(10) Patent No.: US 11,115,373 B1
(45) Date of Patent: Sep. 7, 2021

(54) MULTI-CHANNEL ENGAGEMENT PLATFORM CONVERTER

(71) Applicant: Movius Interactive Corporation, Duluth, GA (US)

(72) Inventors: Sandeep Kakumanu, Cumming, GA (US); Paul Rubenstein, Roswell, GA (US); George Backhaus, Suwanee, GA (US); Amit Modi, Fremont, CA (US); Jon Plotky, Lawrenceville, GA (US)

(73) Assignee: Movius Interactive Corporation, Duluth, GA (US)

( * ) Notice: Subject to any disclaimer, the term of this patent is extended or adjusted under 35 U.S.C. 154(b) by 0 days.

(21) Appl. No.: 16/899,524

(22) Filed: Jun. 11, 2020

(51) Int. Cl.
*H04L 12/58* (2006.01)

(52) U.S. Cl.
CPC ............ *H04L 51/36* (2013.01); *H04L 51/046* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 8,881,180 B1* | 11/2014 | Srikanth | .................. | H04L 51/30 |
| | | | | 719/328 |
| 10,015,167 B1* | 7/2018 | O'Kennedy | ............ | H04L 63/06 |
| 10,735,262 B1* | 8/2020 | Webb | .................... | H04L 67/1004 |
| 2005/0071512 A1* | 3/2005 | Kim | ........................ | G07F 7/084 |
| | | | | 710/1 |
| 2008/0056454 A1* | 3/2008 | Lahtiranta | ............. | H04M 1/642 |
| | | | | 379/67.1 |
| 2008/0057960 A1* | 3/2008 | Lahtiranta | ............... | H04L 67/16 |
| | | | | 455/435.2 |
| 2008/0294735 A1* | 11/2008 | Muntermann | .......... | H04L 51/14 |
| | | | | 709/206 |
| 2011/0130168 A1* | 6/2011 | Vendrow | ............... | H04M 1/663 |
| | | | | 455/556.1 |
| 2012/0254804 A1* | 10/2012 | Sheha | .................... | H04M 1/724 |
| | | | | 715/834 |
| 2013/0238728 A1* | 9/2013 | Fleck | ..................... | G06Q 10/10 |
| | | | | 709/206 |
| 2013/0332825 A1* | 12/2013 | Singh | ..................... | H04H 60/31 |
| | | | | 715/273 |
| 2013/0332838 A1* | 12/2013 | Naggar | .............. | H04N 21/2668 |
| | | | | 715/733 |
| 2013/0332839 A1* | 12/2013 | Frazier | ............... | H04N 21/4668 |
| | | | | 715/738 |
| 2018/0048594 A1* | 2/2018 | de Silva | .................. | H04L 51/36 |
| 2018/0063071 A1* | 3/2018 | Watson | ................... | H04L 67/14 |
| 2019/0325996 A1* | 10/2019 | Yelpaala | ................ | G16H 10/60 |
| 2020/0236072 A1* | 7/2020 | Philip | ................... | H04L 51/046 |
| 2020/0371755 A1* | 11/2020 | Patni | ......................... | G06F 8/41 |
| 2020/0371779 A1* | 11/2020 | Kesiboyana | .......... | H04L 63/168 |

OTHER PUBLICATIONS

Wikipedia, Communication Channel, printed Jan. 6, 2021, pp. 1-6 (Year: 2021).*

* cited by examiner

*Primary Examiner* — Backhean Tiv
(74) *Attorney, Agent, or Firm* — Smith Tempel Blaha LLC; Gregory Scott Smith

(57) ABSTRACT

Conversion of communications from a first device over a firsts communication channel to a second communication channel that is utilized by a second communication device such that an enterprise employee can interface with and communication with a customer using the customer's preferred channel or application for communication.

20 Claims, 19 Drawing Sheets

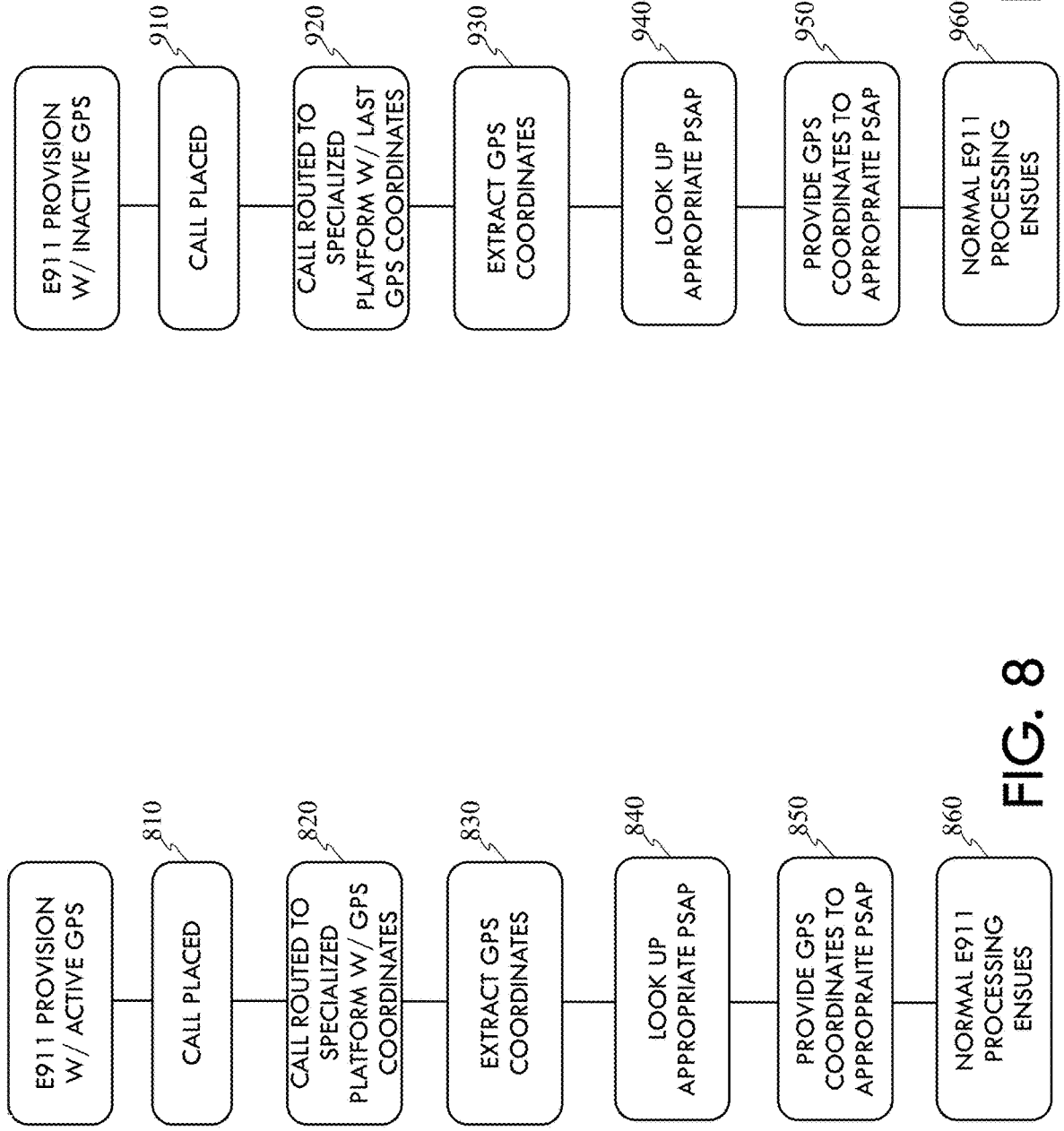

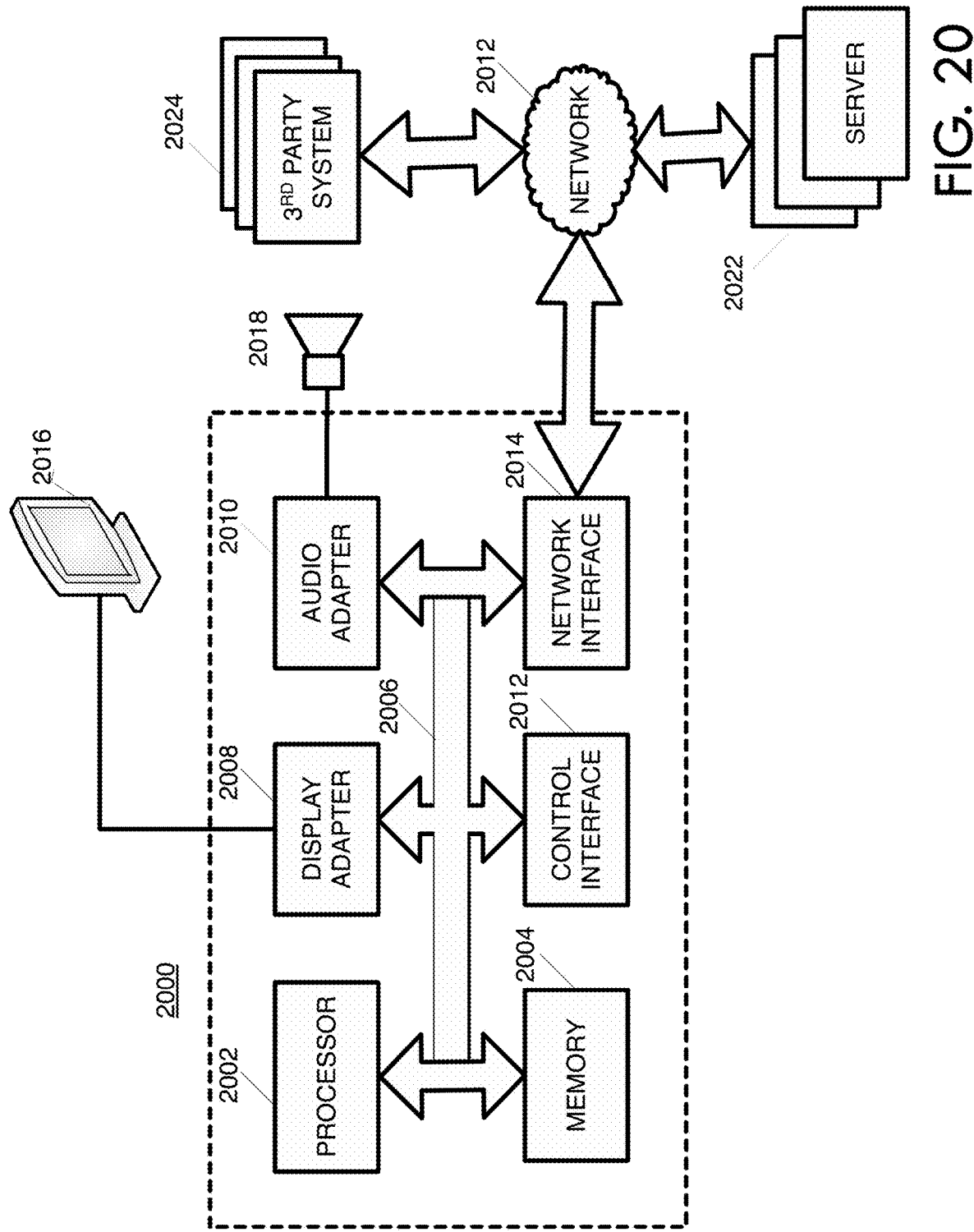

MULTI-CHANNEL ENGAGEMENT PLATFORM CONVERTER

CROSS-REFERENCE TO RELATED APPLICATIONS

The following United States Patents are herein incorporated by reference in their entireties: U.S. Pat. Nos. 9,332,408, 9,979,827, 9,332,128, and 9,854,417. Further, Appendix A includes two documents that are also hereby incorporated by reference (a) The Software Requirement Specification, Movius Common Platform (MCP) Rev. E and (b) MyID Geo Redundancy—Optus MyID, CAFÉ CUSTOMER DOCUMENT.

BACKGROUND

The crazy thing about the advancements in technology that are geared toward making our life easier, is that generally, they end up making our life more complicated, at least at first. For example, there was a time when you watched a show on TV with your family, you enjoyed it, then it was over. Then came the advent of the video cassette recorder (VCR), which seemed like a wonderful advancement that would make our life much easier. However, what happened was parents could work later and not worry about missing a show, kids could stay out and just catch up on the show later, and so, piles of VCR tapes started piling up and they even had to invent special cabinets to hold all of the recorded VCR tapes. So this simple technology advancement that was to make life easier, ended up being a gateway to family chaos, disorder and fractioning.

Similar situations have occurred in the world of communications. First we had a telephone. If you were home when it rang, then you could answer it, if you were in the mood to talk. But if you were not home, it just was not that big of an issue. Then came pay telephones so that if you were out and about, at least you could call others. This led to pagers and mobile phones. All the while internet technology was expanding at breakneck speeds giving rise to emailing, skyping, facebook posting, tweeting, VOIPing, etc. In the blink of an eye our world changed from "catch me if I am home" to "catch me 24-7 in multiple ways at the same time, and don't you dare dump me".

In today's highly connected world, we find that we are in the midst of a communicative ocean that is diversely interfaced with multiple modalities and seamless connectivity. The present disclosure presents systems and methods to reign this ocean in so that users can remain focused and functional.

At any one time, a particular user may be reachable through multiple channels. For instance, a user may have a mobile telephone that can accept a call, an SMS, a text. That same mobile telephone may allow the user to be on FACEBOOK, INSTAGRAM, TWITTER, SNAPCHAT, SKYPE, TINDER, MATCH.COM, LINKED IN, etc. In addition, that same platform can enable the user to shop at AMAZON.COM, listen to music playlist on SPOTIFY while navigating to a next destination with GOOGLE MAPS and receiving the weather from WEATHERBUG. On top of all of this, the user also bounces in and out of other environments that provide other access platforms such as the user's desktop computer, ALEXA, smart TVs, smart refrigerators, smart thermostats, in vehicle systems, etc. Further, there are also public channels that are reaching out to the user in stores, at checkout point of sale terminals, at the gas station pump, etc.

What is needed in the art is a system and method that can harness all of this communicative capability and all the power to be efficiently applied, exploited and utilized in maximizing communication and interaction with users.

BRIEF SUMMARY

Embodiments of the present invention enable cross-platform integration between different devices using different communication channels. In an exemplary embodiment a first server includes a processing unit and memory and provides a multi-channel communications platform. A second server includes a processing unit and memory and provides a gateway that interfaces a first communication element using a first communication channel to the multi-channel communications platform on the first server. The multi-channel communications platform also includes a plurality of application program interfaces (APIs), each of the APIs being configured to communicatively interface the multi-channel communications platform to particular communication channels. In operation, the gateway, comprising software instructions stored on the server that can be executed by the second server, receives a communication from the first communication element over the first communication channel, the communication including a destination address of a second communication element. Using the destination address and the identity of the first communication element and first communication channel as search elements, the gateway accesses a data source to identify the second communication channel utilized by the second communication element. The gateway then forwards the communication from the first communication element to the multi-channel communications platform (MCCP) along with the identification of the second communication channel and destination address.

Further in operation, the MCCP, comprising software instructions stored on the server that when executed by the server, receives the forwarded communication from the gateway and then selects an API from the plurality of APIs that is compatible with the second communication channel. The MCCP then sends the communication through the selected API to the second communication channel of the second communication unit.

An exemplary embodiment comprises a system to enable cross-platform integration. The system includes a first server that includes a processing unit and memory and provides a multi-channel communications platform. The system also includes a second server including a processing unit and memory and providing a gateway that interfaces a first communication element using a first communication channel to the multi-channel communications platform on the first server. The system also includes a plurality of application program interfaces (APIs), each of the APIs configured to communicatively interface the multi-channel communications platform to particular communication channel. The gateway includes software instructions stored on the server that when executed by the second server are configured to receive a communication from the first communication element over the first communication channel, the communication including a destination address of a second communication element. Using the destination address and the identity of the first communication element and first communication channel as search elements, the gateway accesses a data source to identify the second communication channel utilized by the second communication element. At this point, the gateway can forward the communication from the first communication element to the multi-channel communications platform along with the identification of the second communication channel and destination address. The multi-channel communication platform includes software instructions stored on the server that when executed by the server are configured to receive the forwarded communication from the gateway and to select an API from the plurality of APIs that compatible with the second communication channel. The multi-channel communications platform can then send the communication through the selected API to the second communication channel of the second communication unit.

In some embodiments, the gateway is further operative to receive a communication from the second communication element identifying the destination address of the second communication element and the preferred second communication channel of the second communication element. Further, the second communication channel may be the WHATSAPP application and the selected API is a WHATSAPP API that utilizes webhooks to post communications received to WHATSAPP docker containers for communicating with a WHATSAPP sever that delivers communications to the WHATSAPP application on the second communication element.

In some embodiments the second communication channel is the WECHAT application and the selected API is a WECHAT API that utilizes webhooks to post communications received to the WECHAT sever that delivers communications to the WECHAT application on the second communication element.

In some embodiments, the first communication channel is a multi-line enabled smart phone and the destination address is a reserved second line number and further, the gateway is configured to recognize the reserved second line number as identifying the second communication channel of the second communication element.

In some embodiments, the first communication channel is a multi-line enabled smart phone and the destination address is a reserved second line number and further, the gateway is configured to recognize the reserved second line number as identifying the second communication channel of the second communication element.

In some embodiments, the first communication channel is a multi-line service enabled internet of things (IOT) device.

In some embodiments, the first communication channel is a multi-line service enable customer relationship management (CRM) system, a computer, a VOIP phone etc.

BRIEF DESCRIPTION OF THE SEVERAL VIEWS OF THE DRAWINGS

FIG. 8 is a flow diagram illustrating the provision of E911 compliance for IoT devices that have GPS coordinates available.

FIG. 9 is a flow diagram illustrating the provision of E911 compliance for IoT devices that have GPS limited coordinates available.

FIG. 20 is a functional block diagram of the components of an exemplary embodiment of system or sub-system operating as a controller or processor 2000 that could be used in various embodiments of the disclosure for controlling aspects of the various embodiments.

DETAILED DESCRIPTION OF EMBODIMENTS

The inventions that are disclosed within this document, including the several drawings, as well as features and aspects of the inventions, are directed towards various features, aspects and capabilities that are enabled on mobile devices. Further, the various inventions are presented in embodiments that enable the inventions by exploiting and/or utilizing features and aspects of a second line number system or a multiline system, both of which provide one or more additional telephone numbers that are associated with a mobile device.

Multi-Channel Engagement.

One of the inventions described within this document includes providing a platform and a method for a multi-channel engagement solution that applies to both employees of a company as well as their customers. In general a communications platform is t operates as the communication fabric that facilitates the bridging of employee and customer channel preferences. Throughout this document the terms employee and customer will be used to distinguish and differentiate between two very different user categories but, it should be appreciated that different labels, environments or tags could also be utilized such as, government officials and constituents, coaches and team mates, directors and cast members, sales force and purchasers, etc. In general, any domain of individuals that can be separated out or distinguished from each other based on any of a variety of needs, functions, relationships, etc.

In an exemplary embodiment, the multi-channel communications platform (herein after referred to as an MCCP) provides enterprises with a wide and growing set of channels through which communications can occur. For instance, a first class of user (i.e., enterprise employees) may be provided with channel choices that might include, but are not limited to: (a) multi-line applications being executed on a smart phone (e.g. ANDROID, APPLE or IOS devices) with or without enterprise mobility management (EMM); (b) web phone applications for desk top workers; (c) salesforce package for salesforce works; and (d) PBX integration for desk or office workers.

Using multi-line service (from any of the above-listed channels or others not listed) enables the enterprise employees to communicate with customers on a wide and growing set of customer preferred channels, which may include: (a) voice calling, (b) SMS/MMS messaging, (c) WHATSAPP messaging, (d) WECHAT messaging, (e) DUO, (f) iCHAT, (g) FACETIME, as a few non-limiting examples.

As such, it should be appreciated that embodiments of the MCCP may satisfy the needs in the art by (a) providing multiple interfaces (human to human, human to machine, machine to machine, and machine to human), (b) multiple modalities: voice, text, silo social channels, need for text to speech/speech to text, and (c) seamless integration: the provision of plug and play integration with third-party platforms, libraries and API's.

Figure 1:
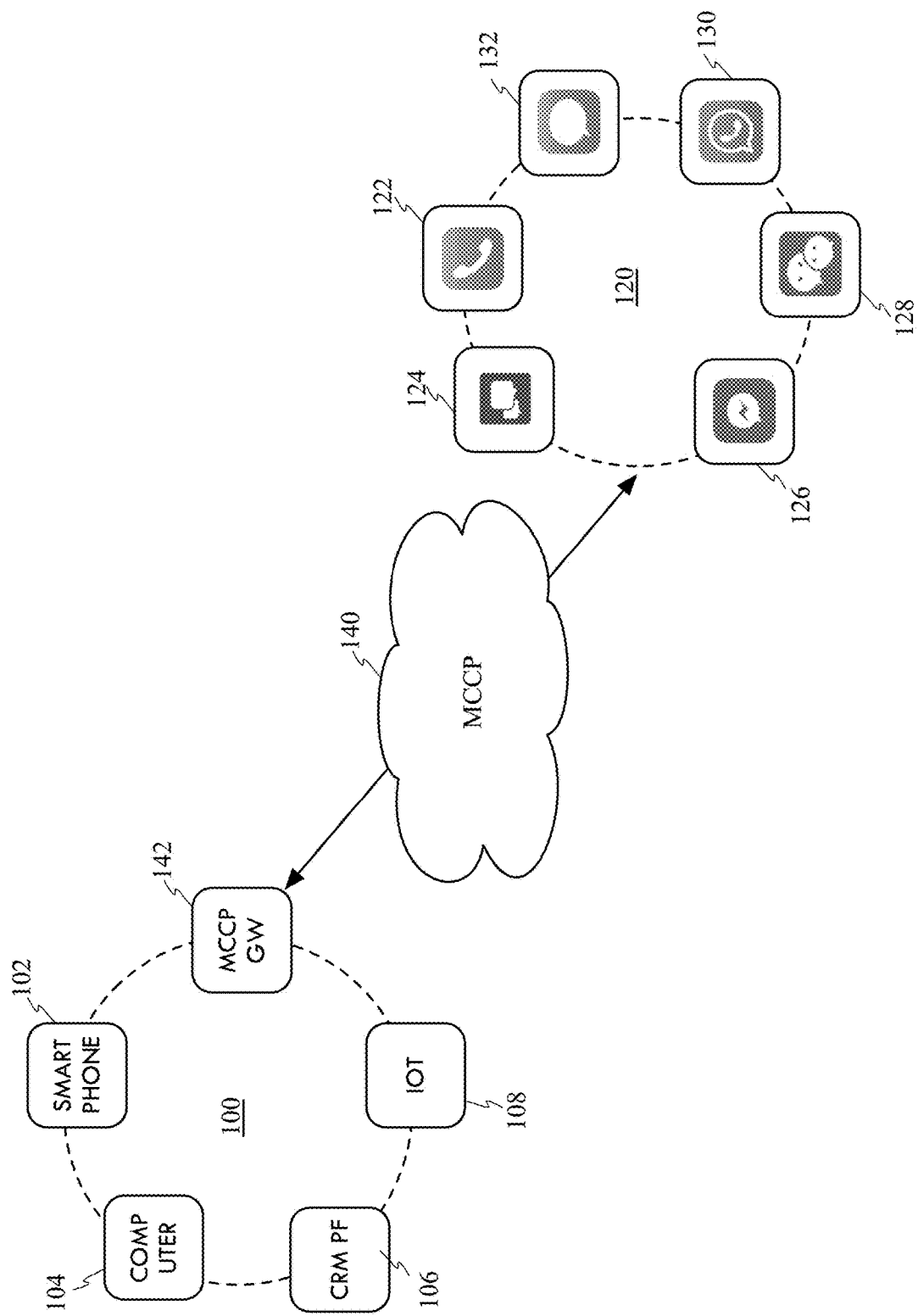
FIG. 1 is a conceptual diagram illustrating the environment in which embodiments of the MCCP can be deployed and operated.

FIG. 1 is a conceptual diagram illustrating an environment in which embodiments of the MCCP can be deployed and operate. In general, embodiments of the MCCP operate to create an integrated, seamless experience across multiple channels and end-points to improve communication efficiency, business continuity and compliance. A first class of user 100, such as a salesman, an enterprise employee, a service provider, etc., is illustrated as having a variety of tools to use for interacting with a second class of user 120. For instance, the first class of user 100 is illustrated as having access to a variety of communication tools, including but not limited to a smart phone 102, a computer 104 (such as a desktop, laptop, note book, etc.), a customer management, tracking or utility system or application 106 (such as a customer relationship management system CRM as a non-limiting example), and a variety of other devices or systems 108 that can be connected to a global network and to other devices or systems through a global network.

FIG. 1 also illustrates a second class of user 120. The second class of user may be viewed as a customer, or recipient of products or services. However, it should also be appreciated that the lines of demarcation presented between classes of users is for illustrative purposes only and the present embodiments are not limited to such class distinctions. In fact, embodiments may operate in peer-to-peer situations as well as any of a variety of other scenarios. The second class of user is illustrated as having access to a plurality of different communication channels. As non-limiting examples, the illustrated user 120 is shown as having access to voice calls 122, Message+ texting 124, MESSENGER 126, WECHAT 128, WHATSAPP 130, and FACETIME 132. It will be appreciated than many more channels are also available but are not listed in FIG. 1.

One of the focuses of various embodiments of the invention related to the MCCP 140 is the communication fabric that enables the first class of user 100 to utilize any and all of the communication tools through an MCCP gateway 142 in communication with a class two user 102 in that user's preferred channel of communication. As such, the communication fabric MCCP 140 enables a shift towards a more personalized level of communication, such as one-to-one or one-to-many across multiple channels. The communication fabric 140 enables bidirectional secure and compliant voice, video and message communication with a high QoS.

Figure 2:
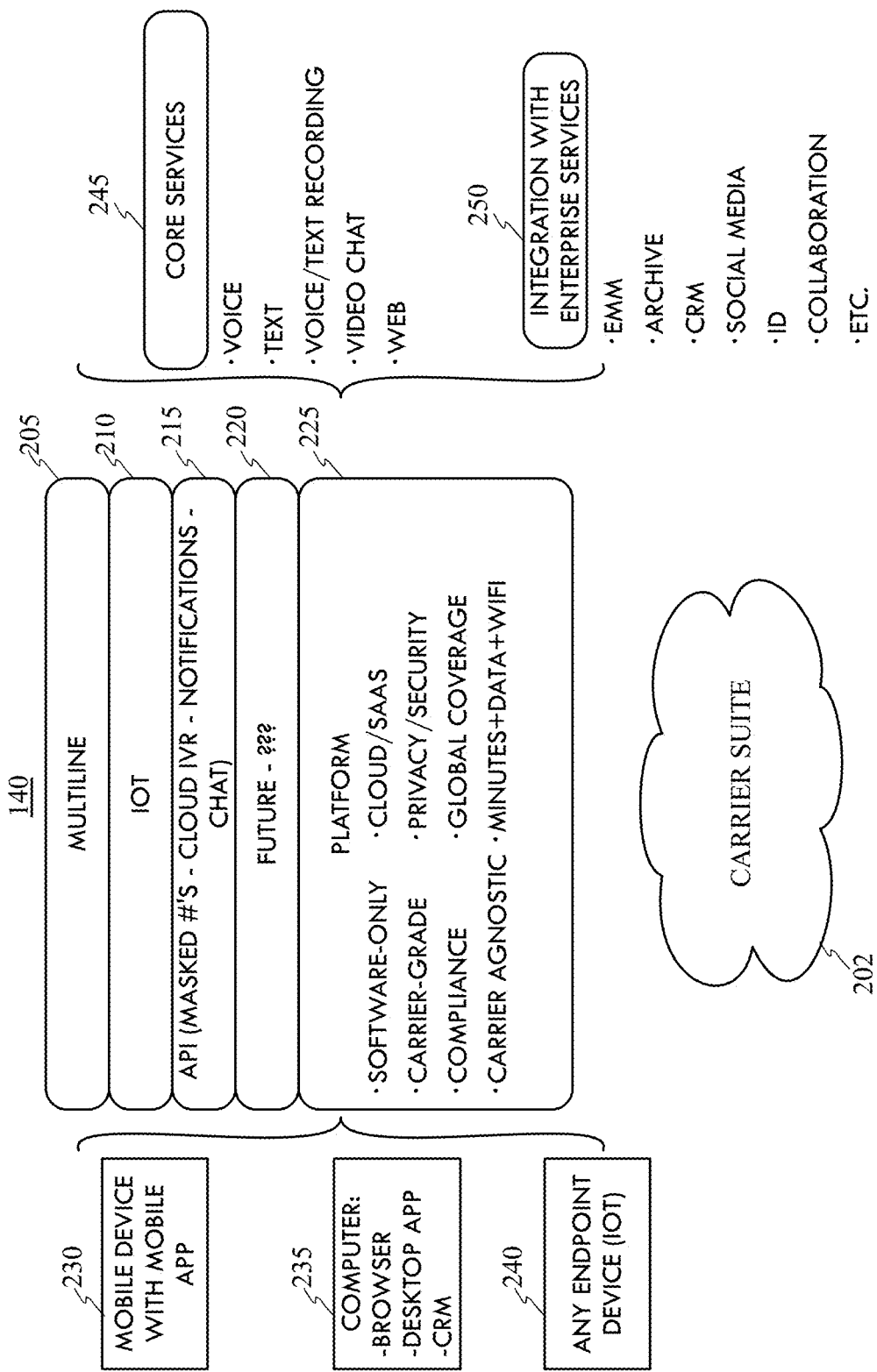
FIG. 2 is a conceptual functional relationship diagram illustrating the general operation of various embodiments of a multi-channel communications platform.

FIG. 2 is a conceptual functional relationship diagram illustrating the general operation of various embodiments of a multi-channel communications platform. The MCCP 140 resides within the telecommunications ether and can exist within and throughout all carrier technologies (i.e, the carrier suite 202 including 5G, 4G, WiFi, 4G, 3G, GSM etc.). While the MCCP 140 is illustrated as residing between a suite of device/applications and a suite of services, it will be appreciated that these lines of demarcation are not necessarily physical but rather are functionally based and the illustrated conceptual functional relationship diagram is simply provided to aid in the understanding of the invention and not necessarily for fabrication. What should be appreciated is that the MCCP 140 can be comprised or constructed of software, hardware or a combination of both on a single system, server or distributed among several systems or servers that are co-located or geographically dispersed. Details of an exemplary embodiment of a platform on which an MCCP 140 can be implemented are presented in conjunction with FIG. 15.

The MCCP 140 provides a multiline service 205 that enables a second, third or nth line to be associated with a carrier enabled mobile smart phone or communication device so that the user can send and/or receive communications using the carrier assigned number or any of the other numbers associated with the device. The MCCP 140 also functions as a communication enabler for the Internet of Things (IOT) devices 210 that are appropriately equipped with a necessary communication module or functionality. This multiline technology is described more fully in each of the above-referenced and incorporated patents.

The MCCP 140 also includes an application program interface (API) functionality 215 for a wide variety of applications, thus enabling the domain of user devices to interface to, interact with and exploit or utilize the different applications. An API is a set of routines, protocols and tools for building software applications and the API specifies how software components are to interact. Thus, the API is utilized to define the interface for a device or software running on a device to interact or utilize an application. A few non-limiting examples of applications that are enabled through the MCCP 140 API functions 215 include Masked Numbers, Cloud IVR, Notifications and Chat. Cloud IVR, or Interactive Voice Response, refers to the availability of Interactive Voice Response (IVR) as a Service platforms and functionality, benefiting from the use of cloud-based technologies.

Masked Numbers or masked calling is a voice API enabled technique where a party can set up phone number proxies to keep parties from knowing each other's phone numbers during a call. The same technique can also allow the parties to send SMS communications to each other without revealing their personal phone numbers. An example of such a system is marketed under the name of TWILIO.

The necessity of masked numbers is evident in many online services that require customers and service providers, or customer to customer interactions but, the user, or the user's employer does not want the actual number to be revealed. For example, in a dating application, two parties may want to talk to each other on the telephone but, having just met, neither party may want the other party to have or know their actual phone number. Other environments that can benefit from a masked number are the ride-sharing industry, online food delivery, room rentals, etc. In each of these scenarios, as well as others, it may be necessary for customers and providers to talk or message each other directly. But one or more of the parties may not feel comfortable sharing their personal phone number. For instance, a ride sharing company does not want the drivers to share their personal number as that may result in the driver taking fares directly without going through the company's dispatch and payment system. These risks can be alleviated by using anonymous proxy phone numbers that mask the actual personal phone number of the user. Thus, the system enables communication, but the customer or the service provider do not see the actual phone number of the other party. Rather, the various parties only see a number that belongs to the platform and forwards their call to the other party. Such systems typically utilize a number pool, which is a list of numbers that can be searched for and selected when a request for a communication setup is received.

Cloud interactive voice response ("IVR") refers to the availability IVR as a Service (IVRaaS) platforms and functionality, benefiting from the use of cloud-based technologies. Cloud IVR is offered through a consumption-based model and provides an always-on, modern IVR platform, giving businesses the opportunity to enhance the customer journey or improve user friendliness of the interaction as well as optimize overall agent interactions.

In the past, IVR systems were implemented on in-house systems, such as PBX systems with automatic call distributors. Such systems would generally implement low-level basic IVR technology. In general, these setups required a large amount of upfront dollars to purchase the equipment, as well as personnel to operate and maintain the equipment. With the emergence of cloud based systems, the cost for IVR capabilities, as well as the maintenance and upgrade of such systems was decreased drastically. One reason for this is that the IVR intelligence can be centrally located on shared equipment and updated and maintained at a single location rather than at various on-site locations, and the personnel utilized to update and maintain such Cloud IVR systems can also be shared (i.e., contracted out to a service entity).

Cloud IVR has been enabled in part based on the widespread availability of cloud virtualization and Session Initiation Protocol (SIP) call delivery over virtual interconnections. The benefits of Cloud IVR over the prior art IVR systems are significant and include, among other benefits: (a) providing an up-to-date IVR system that is supported and monitored 24×7×365, (b) a reduced time to market for IVR capabilities and better reliability, (c) more flexibility to ramp up and down depending on seasonal call volumes, product cycles, etc., (d) ready access to highly skilled, expert IVR developers to supply the complex IVR applications and solutions that a modern contact center needs, including but not limited to personalized and contextual customer self-service applications with multi-lingual speech recognition/natural language understanding, automation and virtual agent capabilities, visual IVR, payments IVR, surveys, and voice biometrics, (d) improved call team performance including increases in first call resolution, driving channel deflection, improving customer satisfaction.

The API functions 215 may also include access to notification systems, chat systems, messaging systems, video/picture/text/voice sharing systems, etc.

The MCCP 140 is also configured to be amenable for expansion as future technology or capabilities are brought to fruition 220.

The MCCP 140 includes many other advantages that make deployment, utilization and operation more readily available and as such, the platform includes a wide variety of characteristics 225. The MCCP 140 allows devices to gain the benefits of the MCCP 140 by a simple software-only addition or upgrade to their devices. The MCCP 140 provides carrier-grade performance and is compatible across the entire carrier suite. The features and functionality of the MCCP 140 are thus carrier compliant and in addition, are carrier agnostic in the sense that whatever carrier is servicing a device, the device can operate with the MCCP 140. The capabilities of the MCCP 140 are cloud base and provided through SAAS techniques. The MCCP 140 provides privacy and security to the users and the MCCP 140 is accessible around the globe. The communication channels through the MCCP 140 can be based on minute usage, data usage, wifi or a combination of any of these techniques and others.

The MCCP 140 thus provides a platform to enable a wide variety of communication based devices, such as a mobile device running a mobile application 230, a computer running a browser, a desktop application or CRM 235, an endpoint device such as any IOT enable device 240, as well as other devices.

Through reliance on the MCCP 140, the devices can gain access to core services 245 including voice, text, voice/text recording, video chat and web access. Further, the devices are also enabled to integrate with enterprise services 250 such as enterprise mobility management (EMM), which is the set of people, processes and technology focused on managing mobile devices, wireless networks, and other mobile computing services in a business context, archives, CRM, social media, authentication and verification systems as well as other services.

The MCCP 140 is not simply a static platform but rather a migrating platform that can be expanded by the service provider as well as through users taking advantage of an application development kit that enables the creation and integration of additional features. The MCCP 140 includes enhanced features such as, but not limited to, group/picture messaging, consumer applications, administrative and user experience enhancements. Further, the MCCP 140 provides communication ease and augmented conversations through technology such as multiline service for CRM (i.e. Salesforce). The MCCP 140 has an expanded global coverage with new instances in new countries and with new regional carriers. Advantageously, the MCCP 140 enables new channels of engagement with a customer or a class of user. Such channels include integration with messaging systems such as WHATSAPP, WECHAT, IMESSAGE as non-limiting examples. In addition, the MCCP 140 is easily expanded with the functionalities of global voice IOT, number masking, API management layer, etc.

MCCP Architecture. I think that we need another diagram and explanation about how to build and MCCP. I have described it as a software/hardware solution that can exist on a server or multiple servers or a distributed system. And we are describing some functions of the MCCP as well. But I think we need to take one step further down into the technology of the MCCP to provide an enabled invention that will overcome potential 35 USC 101 rejections (rejections because invention is mere presented as an abstract idea). Examples would be that we claim that the MCCP provides cross-platform integration so that an enterprise employee using (a) multiline app, (b) webphone, (c) CRM, etc. can bridge the communication to their customer's preferred channel such as (a) WHATSAPP and (b) WECHAT.

Multiline CRM Integration

The MCCP 140 facilitates the integration of multiline capabilities with CRM type systems. Advantageously, this enhances the user experience for both desk-based users and mobile-based users. The user activation of the CRM system is seamless and automatic. For desk-based users, the multiline features can be directly accessed from within the CRM application (such as SALESFORCE as a non-limiting example). As such, the CRM user is enable to (a) send and receive text messages with customers, (b) place and answer calls directly in the browser or CRM application, (c) have an on-going and automatic log generated of multiline messages with a daily roll up that can implement custom objects and custom views, (d) automatic logging of all multiline calls as standard CRM call activities and can include notes, (e) right phone utility for calling, messaging, call and message history, dialer and settings, and (f) quick text support and out of office SMS auto responses. For mobile-based users, the MCCP 140 enables the multiline application to be utilized for calling and sending SMS or text messages to leads, customers and support. Further, the MCCP 140 synchronizes call logs and messages to the CRM system.

In addition to all of this, the MCCP 140 provides a wide range of multiple services and features including (a) call recording, (b) message recording, (c) digital safe integration (d) SMS opt-in, (e) SMS redaction, (f) E911 emergency services, (g) parallel calling, (h) sequential hunt group calling, and (i) enterprise admin portal and reports.

Figure 3:
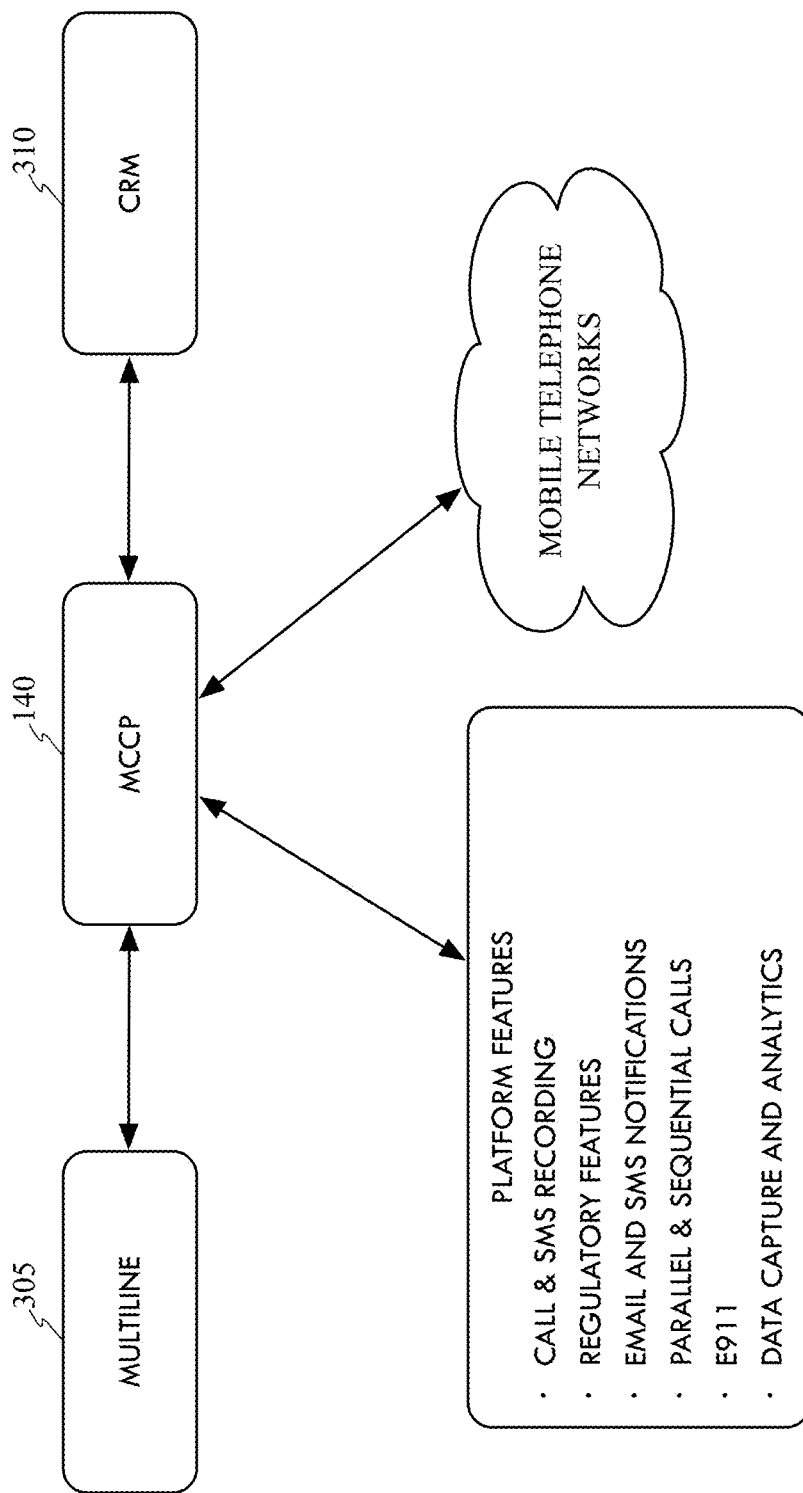
FIG. 3 is a system block diagram illustrating an exemplary architecture for multiline and CRM clients.

FIG. 3 is a system block diagram illustrating an exemplary architecture for multiline and CRM clients. The MCCP 140 provides enhanced features to facilitate general operations. For instance, calls placed from a multiline enable device 305 are automatically synchronized to the CRM system 310. In addition, messages that are transmitted or sent from the multiline enable device 305 are also synchronized with the CRM system 310. This integration is even further enhanced by automatically synchronizing messages that are sent from the CRM system 310 with the multiline device 305. Further, calls that are placed to the multiline number automatically ring or an indicator is provided on both the multiline device 305 and the CRM system 310 and messages that are sent to a multiline number are delivered and displayed on both the multiline device 305 and the CRM system 310. As such, it can be appreciated that the client application of the multiline app and the CRM application are serviced through the MCCP 140 which provides rich services and features.

Chatting App Integration.

The MCCP 140 provides enhanced capabilities for customer channel integration. As enterprises engage with their customers and learn about their preferred channels of communication, the MCCP 140 is able to expand the channel integration. In many markets, users have abandoned traditional SMS utilities due to being overwhelmed with large numbers of SPAM messages. To avoid having to deal with all of the SPAM, users are opting to leverage third-party messaging tools such as WHATSAPP and WECHAT. Advantageously, the MCCP 140 provides cross-platform integration. Thus, regardless of the enterprise employee's preferred communication channel choice (multiline app, webphone, CRM, etc.) the MCCP 140 can bridge the communication to their customer's preferred channel.

Figure 4:
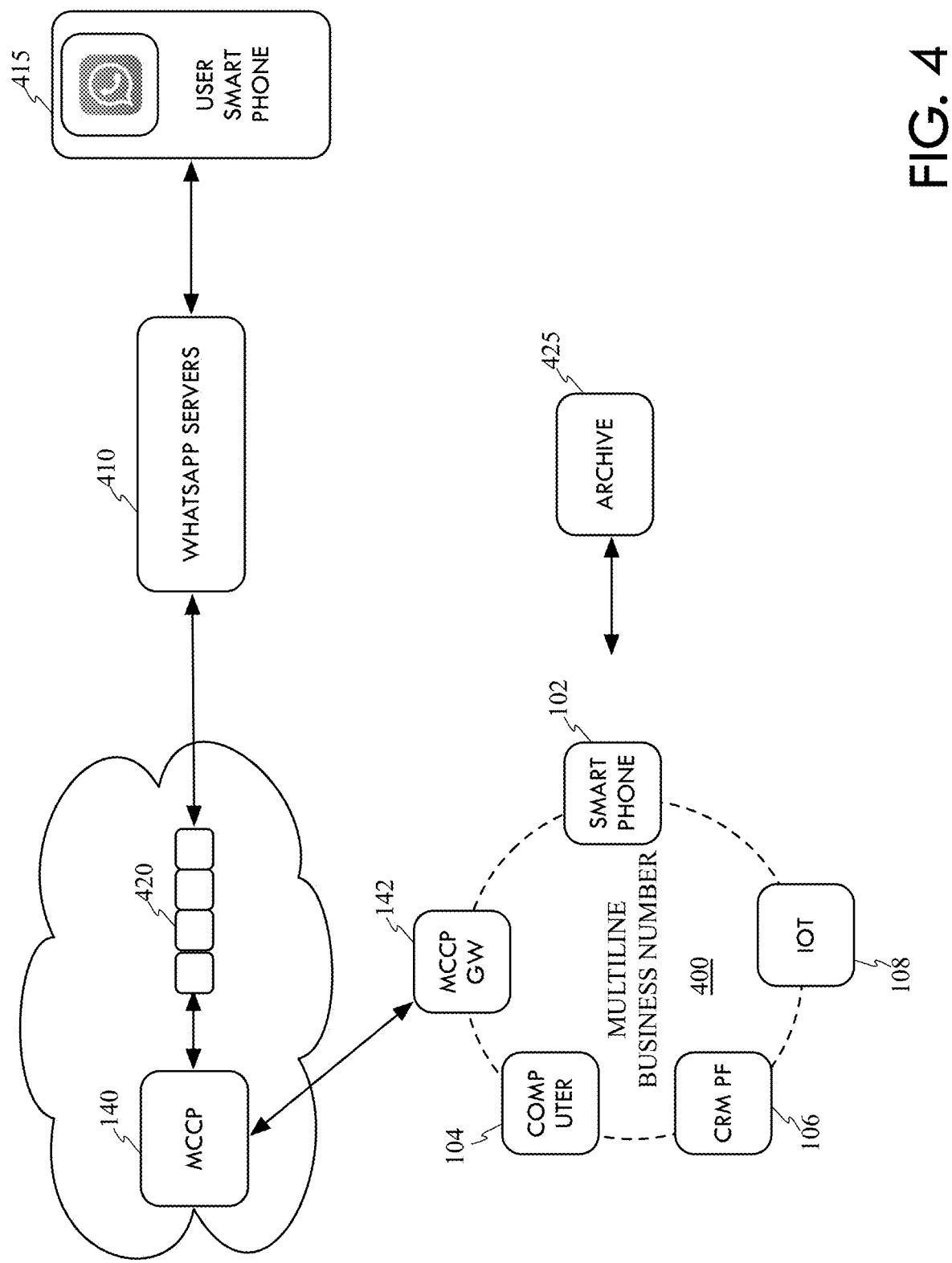
FIG. 4 is a block diagram illustrating an exemplary structure for the MCCP integration with the WHATSAPP texting utility.

FIG. 4 is a block diagram illustrating an exemplary structure for the MCCP integration with the WHATSAPP messaging utility. The MCCP 140 includes a WHATSAPP API and utilizes webhooks to post communications received. Webhooks are one way that apps can send automated messages or information to other apps. As a non-limiting example, it is the mechanism that is used for PAYPAL to notify your accounting app that you have received a payment. As such, webhooks are simple techniques that online accounts can be communicatively coupled to each other and get notified automatically when an event occurs. WHATSAPP docker containers 420 are utilized to hosts both a user-facing REST API and the backend service responsible for communicating with the actual WHATSAPP severs 410. REST is acronym for REpresentational State Transfer. It is architectural style for distributed hypermedia systems. An API is an application programming interface. It is a set of rules that allow programs to talk to each other. The developer creates the API on the server and allows the client to talk to it. REST determines what the API looks like. It is a set of rules that developers follow when they create their API. One of these rules states that you should be able to get a piece of data (called a resource) when you link to a specific URL. REST operates to separate the user interface concerns from the data storage concerns and thus improves the portability of the user interface across multiple platforms. REST design principles enable the overall system architecture to simplified and the visibility of interactions is improved. In order to obtain a uniform interface, multiple architectural constraints are needed to guide the behavior of components. REST is defined by four interface constraints: identification of resources; manipulation of resources through representations; self-descriptive messages; and, hypermedia as the engine of application state.

On the other side of the WHATSAPP servers 410, a user smart phone 415 runs an instance of the WHATSAPP app that is loaded onto the user smart phone 415. As such, any of the devices can be multiline business number enabled 400 and thus used to communicate through the WHATSAPP network to a customer on device 415. The multiline device 400 interfaces to the MCCP 140 through an enterprise middleware software connector and enterprise network, or simply an MCCP gateway 142. A local or cloud-based archival system 425 can be made available for the enterprise.

Figure 5:
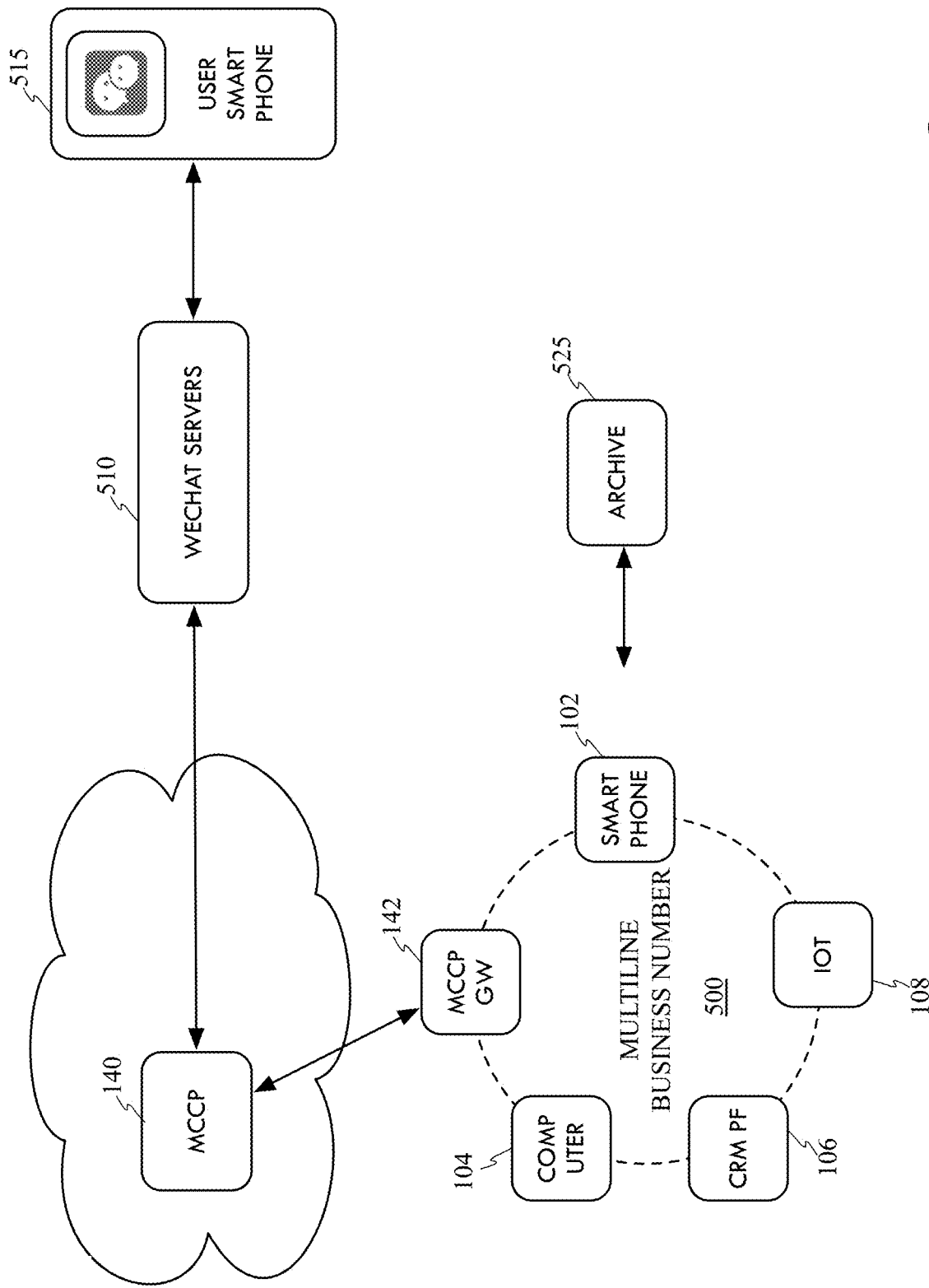
FIG. 5 is a block diagram illustrating an exemplary structure for the MCCP integration with the WECHAT texting utility.

FIG. 5 is a block diagram illustrating an exemplary structure for the MCCP integration with the WECHAT texting utility. The MCCP 140 includes a WECHAT API and utilizes webhooks to post communications received. The WECHAT API gives the MCCP 140 access to the WECHAT servers 510. On the other side of the WECHAT servers 510, a user smart phone 515 runs an instance of the WECHAT app that is loaded onto the user smart phone 415. As such, any of the devices can be multiline business number enabled 500 and thus used to communicate through the WECHAT network to a customer on device 515. The multiline device 500 interfaces to the MCCP 140 through an enterprise middleware software connector and enterprise network, or simply an MCCP gateway 142. A local or cloud-based archival system 525 can be made available for the enterprise.

Figure 19:
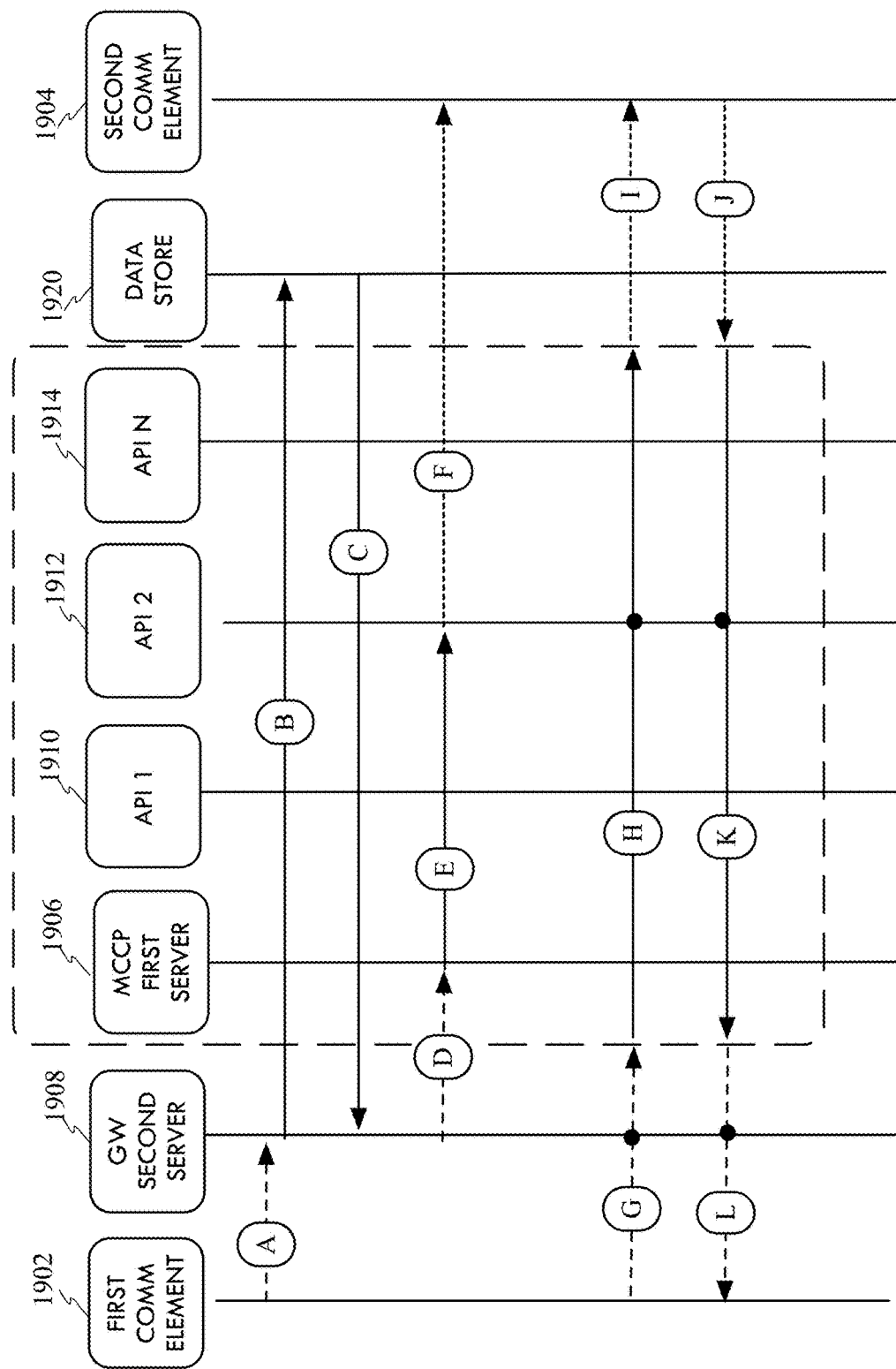
FIG. 19 is an exemplary flow diagram illustrating the operation of an exemplary MCCP in enabling cross-platform communication.

Details of an exemplary flow for communications through the MCCP are further illustrated in conjunction with FIG. 19.

Voice Enablement of IOT

The Internet of Things (IoT) has been defined as a system of interrelated computing devices, mechanical and digital machines, objects, animals or people that are provided with unique identifiers (UIDs) and the ability to transfer data over a network without requiring human-to-human or human-to-computer interaction. In short, IoT includes anything that can be connected to the Internet and that falls into one of three categories:

(a) Collector—these items collect information and then send it to another destination or device over the Internet;
(b) Receiver—these items receive information over the Internet and then act on it
(c) Combination of collector and receiver.

The voice enablement of IoT devices expands the utility of IoT devices but, before looking at voice enablement of IoT devices, the connectivity of IoT devices through a mobile and/or telecommunications network needs to be understood.

The domain of the "internet of things" has evolved due to expanded growth in technology and communications technology. For example, the convergence of multiple technologies, real-time analytics, machine learning, commodity sensors, and embedded systems has had considerable impact in the growth of the domain of IoT. Traditional fields of embedded systems, wireless sensor networks, control systems, automation (including home and building automation), and others all contribute to enabling IoT. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

An aspect in various embodiments of the inventive concepts presented herein includes the voice enablement of IoT. Voice plays a pivotal role in a large range of IoT applications for several reasons:
(a) Speech is the natural mode of communications for humans;
(b) Voice telephony is an efficient means of bi-directional voice communication with machines that can listen, and respond without the need for complex commands;
(c) Voice recognition is particularly appealing when the human's hands or eyes are otherwise occupied;
(d) Cost saving factors: Voice integration could potentially challenge the need for a touch screens or other user interface or input/output components on many devices, as it eliminates and thus reduces the cost for devices that will be dormant for the majority of the time.

Within the domain of IoT there are three categories of voice services:
(a) Bi-direction voice—this category is common in human-to-human interaction via a human machine interface (HMI);
(b) Mono-directional voice—this category simply requires voice to be transmitted in one direction, or at most, the transmission of one audio source to many receiving devices;
(c) Voice recognition—voice recognition allows a range of functions to be controlled by means of voice on a number of different device types such as computer operating systems, commercial software for computers, mobile devices (smartphones, tablets), cars, call centers, and internet search engines.

For each of these categories, a variety of non-limiting use case examples are provided herein for the purposes of illustration. The various embodiments of the present invention can implement and provide the functionality of these use cases; however, the present invention and embodiments thereof are not limited by the exemplary use cases presented. First, the IoT market segment is identified. Following each market segment is a list of one or more IoT application categories.

Figure 6:
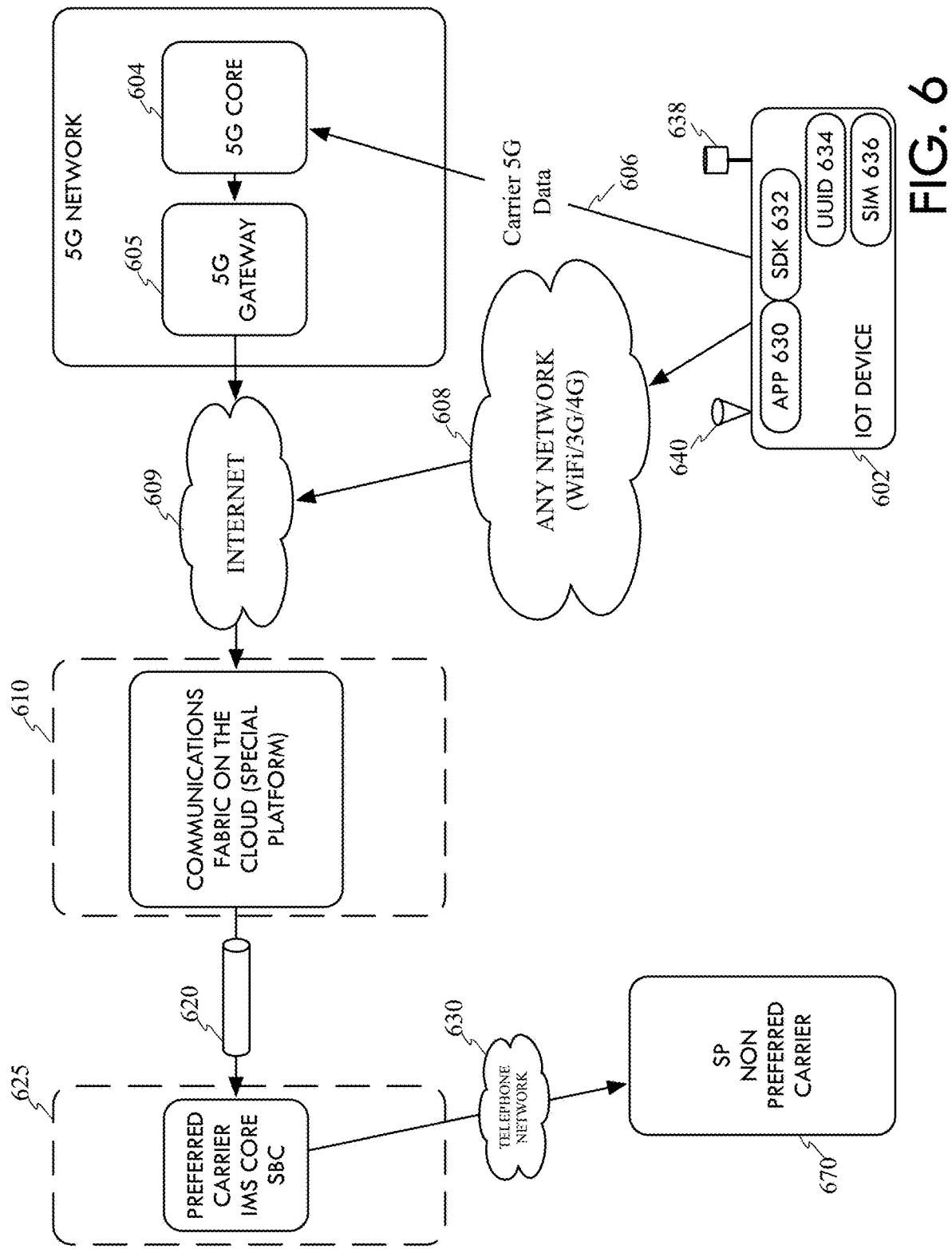
FIG. 6 is a conceptual block diagram illustrating an embodiment of a platform for implementing various embodiments of the voice enabled IoT aspects of the present invention.

IoT Voice Application Use Cases: Bi-directional voice
Home Security—Security call center, emergency services, voice integrated video monitoring and broadcasts
Retail—customer interaction
Industrial—maintenance, integration into manufactured equipment, training
Healthcare—in-hospital care and outbound patient calls, wearable healthcare device integration, remote monitoring patient care (e.g. trip or fall confirmation/assistance) remote interaction between patient and medical professional
Vehicles—e-call and b-call services, emergency and breakdown, logistics and fleet management, vehicle notifications and tracking
Robotics—manufacturing (e.g. robotics assembly), military (drones), healthcare (surgery)
Wearables—industrial, entertainment and medical devices
IoT Voice Application Use Cases: Mono-directional voice
Building automation—door entry controls and authentication, smoke and fire alarms, temperature monitoring
Public safety—PTT for emergency communications, training
Robotics—manufacturing (e.g. robotics assembly), military (drones), healthcare (surgery)
Smart cities—public transportation system notification, public address systems, emergency scenario mass notifications, intercoms FIG. 6 is a conceptual block diagram illustrating an embodiment of a platform for implementing various embodiments of the voice enabled IoT aspects of the present invention. An IoT device 602 is illustrated as being communicatively coupled to a 5G network 604 utilizing a data channel 606 of a particular carrier. The IoT device 602 can also be communicatively coupled to other non-5G networks 608 such as WiFi, 3G, 4G etc.

As previously mentioned and described by way of example, a wide variety of devices can be classified as IoT devices. One aspect of the various embodiments presented herein is the enablement of devices as IoT devices. The IoT enablement allows for third parties to use their devices as IoT devices. A software package, module, block of code, executable file that can be linked to, hardware module/chip (collectively referred to as the IoT Enabler) is provided to third parties for incorporation into their products. The IoT Enabler provides an application program interface (API) for initiating a SIP call. As a more specific example, the IoT Enabler may include a library of files that can be linked into the software already within a third party product, and once linked in, the API is thus available to enable the SIP calls. For example, a dashboard command control center on a car can include the IoT Enabler. In such an embodiment, if the car is in a crash, or GPS fencing is being used to identify particular location information about the vehicle, or other alarm condition is triggered, a call can be made to report the same. In some embodiments, the trigger may result in a "call one" operation where a single call is placed to a particular party or destination. In other situations, a "call all" in parallel mode can be enabled. In this mode, the IoT enabled device places multiple parallel calls to different parties. Finally, another mode is "call sequentially". In the call sequentially mode, the IoT enabled device simply calls numbers, one by one, in succession in response to the trigger.

A typical IoT device 602 may include an app 630 that defines the functionality of the device. It should be understood that the IoT device may include multiple apps but for illustrative purposes, a single app 630 is being referenced. To implement the device as an IoT device, the app 630 can be linked together with the modules or library available in the IoT enable software development kit SDK 632. Each IoT device may include a universally unique identifier (UUID) 634, such as a 128-bit number as a non-limiting example. The UUID is used to identify a device and/or a SIM card 636 which enables the device to place a call over a network supporting the SIM.

For an IoT device 602 operating as a collector, the IoT device 602 may be triggered by the actuation of a sensor or button such as button 638 or by activity that occurs on sensor 640. Regardless of the wide range of events that can occur and be detected, once the IoT device is triggered, it initiates a communication to a destination over the Internet. In the illustrated embodiment, the communication may be initiated by placing a VOIP call utilizing the SIM card and going over a cellular data network. Alternatively, the communication may be initiated by interfacing to the special platform 610 and providing the UUID associated with the IoT device 602. The special platform 610 can then associate or assign a second line service (SLS) number to the IoT device 602. The SLS number may be a temporary assignment or a permanent assignment. The SLS number can be provided back to the IoT device 602 and the device can initiate a call to the SLS number. In some embodiments, a pilot number may be provided to the IoT device 602. When the IoT device 602 places a call to the pilot number, the special platform 610 recognizes the number and triggers an application in response thereto.

Thus, when a trigger occurs on the IoT device 602, depending on if it is affiliated with a carrier network or other network, a call can be placed or initiated by the IoT Enabler provided through the SDK 632. When the call is placed, the information in the call setup request includes the UUID of the IoT device (i.e., a 15 digit (128 bit) UUID number). The call setup request traverses through the network and is received at a specialized platform 610. The special platform 610 assigns a telephone number for the call completion.

More specifically, FIG. 6 illustrates an IoT device 602 that includes a custom app 630 and capabilities provided through the use of a software development kit (SDK) 632 (i.e., library files that are linked to upon compilation, etc.). In some embodiments, the IoT device 602 may include a SIM card 636. In such embodiments, the IoT device 602 can directly initiate communications through the cellular data network of the carrier that services the SIM card 636. However, for IoT device 602 that do not have a SIM card or simply want to have an enhanced capability, the IoT device is assigned a UUID. In such embodiments, in response to a trigger the SDK 632 operates to communicate with the specialized platform 610 and provide the UUID 634 of the IoT device 602. The specialized platform 610 then selects a network recognizable telephone number to be associated with the UUID 602. The specialized platform can then initiate a communication to an intended destination utilizing the assigned telephone number. Such communications can be a call or an SMS to the telephone number.

Figure 7:
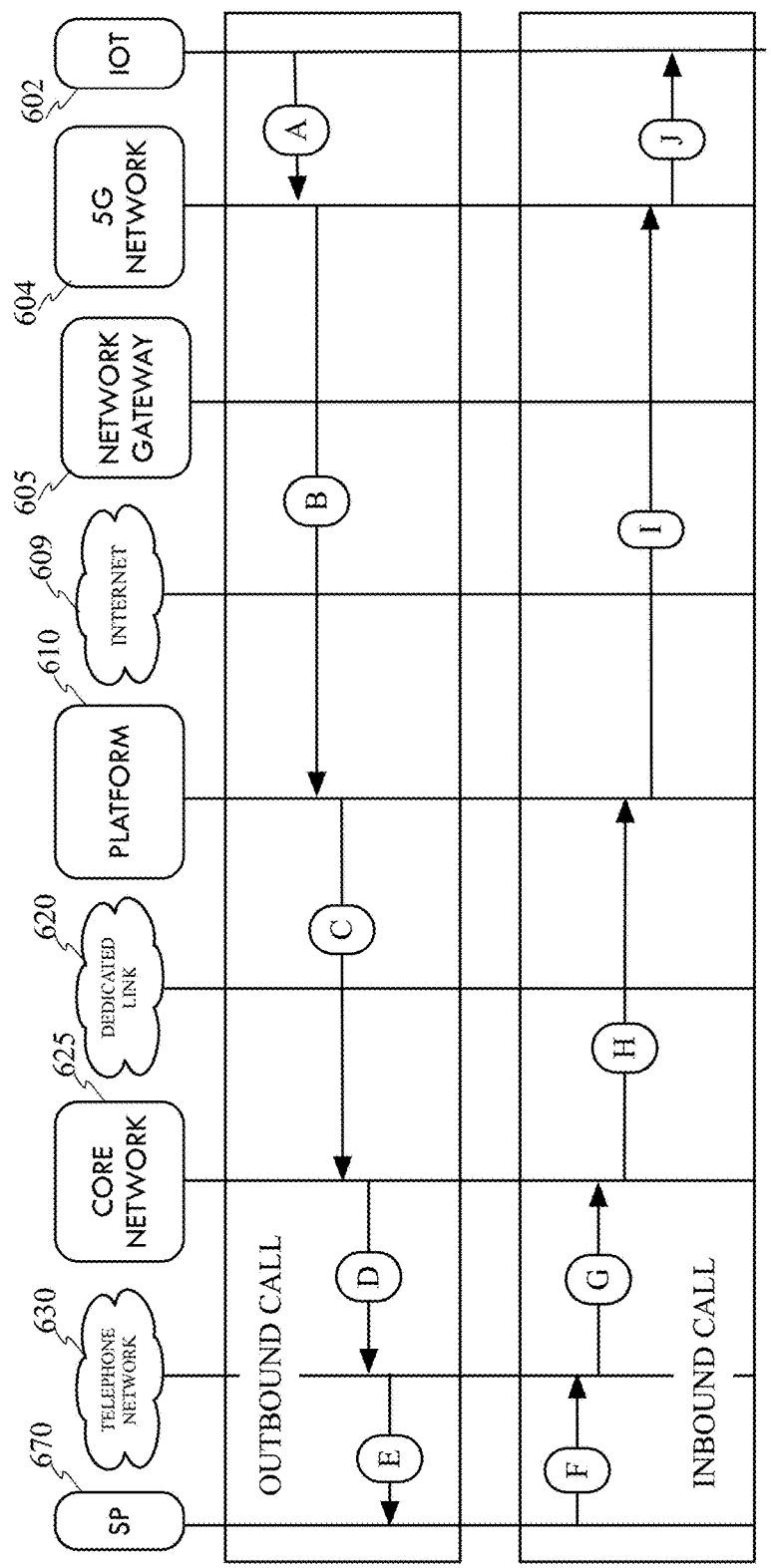
FIG. 7 is a communication flow diagram illustrating the operation of an IoT device 602 equipped with embodiments of the invention.

FIG. 7 is a communication flow diagram illustrating the operation of an IoT device 602 equipped with embodiments of the invention. Two directions of communication are illustrated: (1) from the IoT device 602 to a smart phone 670 and (2) from a smart phone 670 to an IoT device 602. Taking the first communication direction, the IoT device 602 incurs a triggering event and thus initiates a VoIP call (A) to the 5G Network 604. It should be appreciated that the IoT devices 602 does not have its own network terminable telephone number, but rather, it simply has data connectivity. The IoT can have any underlying technology data network access such as with a SIM card, WiFi or other data network including, but not limited to, 3G, 4G and 5G. The application on the IoT device 602 is optimized to work on any of these networks and does not have to assume any particular network. The VoIP radio network is a tie in to the underlying network. As such, the IoT devices make an API call to the platform 610 and the API call results in setting up a VoIP call to the 5G network 604. The 5G network 604 provides IP packet connectivity (B) to the specialized platform 610.

At this point the specialized platform 610 operates to perform one or more of many actions in response to a triggering event from the IoT device 602. For instance, the specialized platform 610 can perform hunt group calling, parallel calling, email and SMS notifications, web hook triggers, single destination call, etc. While various embodiments may utilize various techniques for accomplishing this, an exemplary embodiment utilizes a technology developed by the applicant for the implementation of a second line service.

Using the second line service or multiline service, each IoT device 602 or groups of IoT devices can be associated with a particular multiline number for enabling the IoT device 602 to complete a call to an intended destination. In one implementation, each of the IoT devices 602 in a group of one or more IoT devices are associated with a particular user. As such, the specialized platform 610 is aware of or has a mapping of particular UUID's 634 to particular users or smart phone (SP) destinations 670. Thus, if a trigger occurs by one of the IoT devices 602 in a group of IoT devices, the device initiates a secure VoIP connection to the hosting network 604, which is illustrated as being the 5G Network in this exemplary embodiment. The hosting network provides IP packet connectivity to the specialized platform 610. It should be noted that the IP packet connectivity need not be a special dedicated link. The specialized platform 610 is an endpoint on the cloud. A similar flow would occur if the device was roaming on another network or was associated with another network except the flow would go through the other network 608 to reach the specialized platform 610.

Once the specialized platform 610 identifies the UUID 634, the specialized platform 610 assigns a second line number or selects a second line number associated with the destination device and initiates a call (C) over a dedicated link 620 through the core network 625 servicing the destination SP 670 and utilizing the service provider telephone number assigned to the SP 670. It should be noted that a dedicated link is not required but, a dedicated link 620 can be utilized for security or reliability. It is also important to note that a typical smart phone device would actually have a native connection to utilize when talking to the platform 610 to then use a virtual phone number to talk to a device (ie. an second line service data call). However, an IoT device has a native identifier, a globally unique identifier and the platform 610 has a second line service number that is associated with the IoT device. When the IoT initiates a communication through the platform 610, he second line number reserved or assigned to the IoT device can be utilized in the Caller ID field to indicate that the call or communication is being requested from the IoT device 602, or from one of the IoT devices 602 in a group of IoT devices associated with the second line number. Thus, in some embodiments, each IoT 602 device, when accessing the specialized platform 610, may have a unique second line number associated with the UUID 634 or, a second line number may be associated with a group of IoT devices. Further, the second line number may also be associated with a particular trigger time for a particular IoT device 602 or may be associated with a particular trigger type that can be received from a group of IoT devices.

The core network 625 continues the call path (D) through the telephone network 630 to the SP 670 causing the phone to alert, such as ring (E). The SP 670 can then identify the triggering event and/or the originator of the triggering event by examining the second line number in the caller ID field.

Thus, when a triggering event occurs with IoT device 602, the IoT device generates a SIP invite and the UUID of the IoT device is used to populate the "from" field of the SIP invite. The actions identified in FIG. 7 as (C), (D) and (E) take place over the core network to cause a call to be placed to the desired application. Thus, the platform 610 makes a call to a specific destination. When the voice channel is connected, then voice commands can be sent to the IoT device 602. For instance, if the IoT device 602 is located in elevator 6 of a building, when a trigger occurs, such as the emergency button is pushed, a call can be initiated to the building maintenance. The building maintenance can then use voice commands over the voice channel to talk to the elevator to identify status, run diagnostics or recover, reset, or take other control actions as well as to provide announcements to any passengers that the matter is being tended to and to remain calm and patient.

In the reverse direction, SP 670 to IoT device 602, a phone or SP 670 on any network can initiate a call to an IoT device 602. In one embodiment, each IoT device 602 may have a second line number assigned thereto. The second line service is further described in the above-listed patents that are incorporated by reference. In another embodiment, a group of IoT devices may have a second line number assigned to it. In yet another embodiment, an IoT device 602 may have several second line numbers assigned to it with each number being earmarked for a specific function or action that is being invoked in the IoT device 602. In other embodiments, the IoT devices 602 may have a second line number assigned to it but be specifically programmed to respond to incoming calls based on the time the call is received, the time delay between calls received, the number of calls received, etc. For instance, an IoT device 602 may be programmed to perform operations in a sequence or to move from state to state. Each such operation or transition may be triggered by sequential calls being received. Thus, if the IoT device 602 transitions from state 1, state 2, state 3, state n then back to state 1, each call received may cause the IoT device 602 to transition to the next state. If the IoT device 602 includes a sequence of operations, such as operation 1, operation 2, operation 3, operation n, operation 1, then each call received by the IoT device 602 can result in the IoT device 602 performing the next operation in the sequence. In groups of IoT devices, each of the devices may transition to the next state or perform the next operation in unison as the calls are received. In addition, for a group of IoT devices, each IoT device 602 may be programmed to respond to calls during certain time windows or, the devices may be programmed to respond to certain calls in a sequence of calls. For instance, IoT device 602(*a*) may respond to the first received call, IoT device 602(*b*) respond to the second received call, IoT device 602(*c*) respond to the third received call and IoT device 602(*a*) responding to the fourth receive call etc., as a non-limiting example.

Thus, when the SP 670 places a call to the second line number (F) the call is routed through the telephone network 630 and then routed (G) to the core network 625 servicing the SP 670. The core network 625 recognizes that the second line number being called is to be serviced by the specialized platform 610 and as such, the call is routed (H) over a dedicated link 620 to the specialized platform 610.

The specialized platform 610 recognizes the second line number that is called and looks up to determine the UUID 634 associated with the second line number. The 5G network 604 provides IP packet connectivity (I) from the specialized platform 610. The 5G network 604 can then establish a VoIP call or other form of connectivity (J) to the IoT device 602. At this point control signals or commands can be sent to the IoT device 602.

It should be appreciated that communication exchanges between the IoT device 602 and the specialized platform 610 can be performed with secure protocols. For instance, SIP over TLS is a secure session initiation protocol for call signaling. This protocol can be used from the TCP 5061 port and provides call signaling. In addition, HTTPS/REST is a secure restful API to the specialized platform. This protocol can be used from the TCP 8021 port for REST API. Also, SRTP, secure real-time transport protocol and audio flow can be utilized. This protocol can be used from UDP 1024-65535 port and provides RTP for media flow.

The calls and SMS communications to the core network may be performed over a private dedicated link into the core network.

Further, data that is at rest is also protected in various embodiments. The user's personal identifiable information (PII) when storing names, email addresses, physical addresses, etc. can be encrypted for security. In addition, disk volumes can also be encrypted.

E911 Compliance for IoT

E911 compliance can be provided by IoT devices in the various embodiments presented herein. FIG. 8 is a flow diagram illustrating the provision of E911 compliance for IoT devices that have GPS coordinates available.

Initially, a call is placed 810 (as described in reference to FIG. 7) and ultimately routed 820 to the specialized platform 610 with GPS coordinates being included in the call signaling headers. These coordinates are extracted from the headers 830. The GPS coordinates are then used to identify the appropriate public safety answering points (PSAP) that services the identified location 840. In December 2003, the FCC began collecting data to build a registry of PSAPs. A primary PSAP is defined as a PSAP to which 911 calls are routed directly from the 911 Control Office, such as, a selective router or 911 tandem. A secondary PSAP is defined as a PSAP to which 911 calls are transferred from a primary PSAP. The PSAP database serves as a tool to aid the Commission in evaluating the state of PSAP readiness and E911 deployment. Once the appropriate PSAP is identified, call is routed to the PSAP and thus, the specialized platform 610 makes the GPS coordinates or location of the calling device available to the PSAP operator 850. At this point the existing E911 infrastructure leveraged by the core network is then used 860.

FIG. 9 is a flow diagram illustrating the provision of E911 compliance for IoT devices that have GPS limited coordinates available. For IoT devices that have GPS but the location is not currently available (i.e, inactive), the process is similar. Initially, a call is placed 910 (as described in reference to FIG. 7) and ultimately routed 920 to the specialized platform 610 with GPS coordinates being included in the call signaling headers. The GPS coordinates that are included in the call signaling headers are the last known GPS coordinates. These coordinates can be relatively accurate if the device regularly collects GPS coordinates but has momentarily been out of signal reach. These coordinates are extracted from the headers 930. The GPS coordinates are then used to identify the appropriate public safety answering points (PSAP) that services the identified location 940. Once the appropriate PSAP is identified, the call is routed to the PSAP and thus, the specialized platform 610 makes the GPS coordinates or location of the calling device available to the PSAP operator 950. At this point the existing E911 infrastructure leveraged by the core network is then used 960.

For IoT devices that do not have GPS access at all, address information can be stored in the IoT device along with the user's record through the specialized platform. At this point, RESTFUL web services and GUI applications are available for end users, resellers and application developers.

Service Continuity for Multiline—Cellular/WIFI Transitions

As previously described, various embodiments provide a multiline service. This multiline service can utilize many available networks for maintaining service continuity. Subscribers to the multiline service are able to set up their devices so that outbound calls are automatically placed over channels that use minutes or channels that use data. Alternatively, a dialer loaded onto the device and executed by the user can allow the user to select between minutes or data at the time of placing the call. The difference between these options is that minute based calls are placed over cellular voice channels and the calls toll on the minutes that are allotted to the subscriber. However, data based calls occur over data channels and thus, do not toll against the subscriber's minutes but rather, the amount of data that the subscriber has utilized.

For receiving calls, the subscriber can set up their devices to either receive calls over minutes, data or to first try data and if not successful, then to default to minutes.

The cellular infrastructure has been well tested out and developed to maximize the performance of calls over voice channels, or minutes based calls, including changing power levels and handling handoffs between cellular towers to minimize call drops and transition noise. The various embodiments that provide the multiline service are configured to also provide improved performance for data based calls. Two of the functionalities or benefits incorporated into the various embodiments include zombie WiFi support and network switching—data handover call support.

A Zombie WiFi is a connection from a device which does not have any connectivity to an external network (and hence no connection to the specialized platform). A Zombie WiFi situation can occur when a user's home/office internet goes down or service is unavailable but the WiFi is still up and running. A Zombie WiFi can also occur in public settings, such as an airport, where there is a WiFi connection available but a login is required before external access can be permitted.

In various embodiments of the invention, a functional system, such as a software, hardware or combination of both systems alleviates the ramifications of a Zombie WiFi scenario. This functional system is referred to as the Zombie Fixer or WiFi Fixer Module. It should be understood when the term "module" is used in this description, it may include a hardware component, a software/firmware component or a combination thereof. As such a module may be a board, a set of circuitry, a processor executing software or firmware or executable code, a portion of code such as a routine, program, function call, library file, etc. The Zombie Fixer operates to check for the validity of the WiFi connection. If the WiFi connection is not valid, the Zombie Fixer will cause the device, such as a mobile device, to default back to the cellular network. Optionally, the Zombie Fixer can provide a notification to the subscriber that WiFi is not available and that the device, and any application running on the device, is connected over mobile data. This notification can be provided by presenting text on a screen, turning on a status icon, sounding a notification noise, etc. Thus, this has the effect of overriding the WiFi settings of the device and ensuring connectivity of the device operating within a Zombie WiFi scenario. Each time the network interface on the device changes, the Zombie Fixer first identified this condition (i.e., identifies when the network has changed) and then can operate to check the validity of the WiFi connection. In addition or alternatively, the device can be set up to periodically test the network connectivity. When the network changes, the Zombie Fixer re-registered the device so that the end points of a call are known. Thus, when WiFi becomes available, the Zombie Fixer can then revert the device back to WiFi rather than using the mobile data.

As a more detailed and specific example, if the mobile device being used in a call moves to a location that is serviced by a different network, the Zombie Fixer can issue a re-invite SIP message. When the mobile device connects to the new network, the new network assigns a new IP address for the device. In essence, the mobile device registers and in a sense, tells the network "I am here and here is my address". The SIP message is a re-invite for the components in the call to connect back to that call. While the SIP re-invite call is part of the SIP protocol, in the various embodiments it is specialized platform 610 that is configured specifically to identify the re-invite SIP message and handle the message to ensure that the call is handed off properly to the new network. It will also be appreciated that utilizing the SIP protocol is just one way to implement this feature of the various embodiments. Other embodiments can utilize other protocols, such as the Communication Application Framework Environment (CAFÉ), as a non-limiting example.

Figure 10:
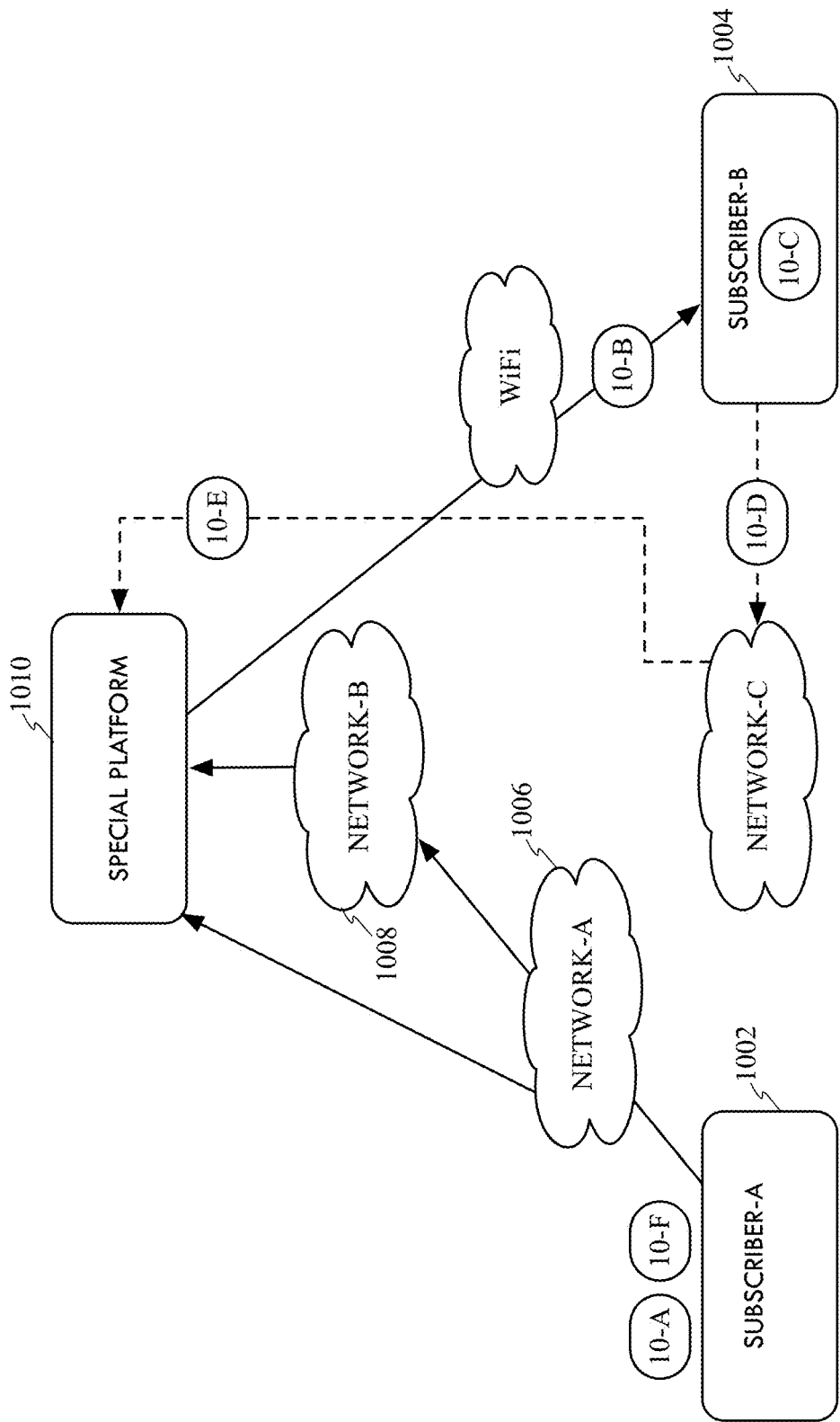
FIG. 10 is a flow diagram illustrating the operation or call flow of a VoIP WiFi to cellular data handover incorporated into one or more embodiments of the invention.

Another functionality in the various embodiments includes the VoIP WiFi to cellular data handover capability. FIG. 10 is a flow diagram illustrating the operation or call flow of a VoIP WiFi to cellular data handover incorporated into one or more embodiments of the invention. The illustrated flow presents a scenario that embodiments of the present invention that include the WiFi Handoff function can remedy. The WiFi Handoff function, similar to other functions described herein, could be implemented in hardware, software or a combination of both. In operation, SUBSCRIBER-A 1002 initiates a call 10-A to a second line number associated with SUBSCRIBER-B 1004. The second line number of SUBSCRIBER-B may be one of the multiline numbers assigned to the SUBSCRIBER-B device 1004 and serviced by the special platform 1010. The call initiated by SUBSCRIBER-A can go through NETWORK-A 1006 directly to the special platform 1010 or it may be passed off to NETWORK-B 1008 that services or interfaces to the special platform 1010. In either case, the call is ultimately received at SUBSCRIBER-B's second line service equipped device 1004. In the scenario being described, SUBSCRIBER-B's device 1004 is operating on the private WiFi network for SUBSCRIBER-B, such as SUBSCRIBER-B's home or office networks, etc.

At some point in time, while the call from SUBSCRIBER-A to SUBSCRIBER-B is still active, SUBSCRIBER-B loses the WiFi connection 10-C. The loss of the WiFi connection could be for any of a variety of reasons, including physically leaving the location covered by the WiFi or the WiFi system going down as non-limiting examples. Regardless of the cause, the WiFi Handoff function within SUBSCRIBER-B's device 1004 sends a session initiation protocol (SIP) registration 10-D with a new IP address to the special platform 1010. As illustrated, this SIP registration can be sent through a NETWORK-C or whatever network it is that services the SUBSCRIBER-B device 1004. Ultimately, the SIP request arrives at the special platform 1010 and the call from SUBSCRIBER-A to SUBSCRIBER-B is transitioned to the data network 10-F (i.e. NETWORK-C) without interrupting the call and without continuing the call on the voice or cellular data network.

In the reverse direction, suppose a call between SUBSCRIBER-A's device 1002 and SUBSCRIBER-B's device is established over cellular data. The default or settings of SUBSCRIBER-B's device can be set to select or force the use of WiFi when available. As such, if the Zombie Fixer Module described above detects that WiFi is available, the Zombie Fixer Module can transmit a SIP request to the special platform 1010 to transfer the call from cellular data to WiFi.

It should be appreciated that many different scenarios can exist in which aspects of the handoff function can be utilized. For instance, a few of these scenarios include: (a) a communication path is established between two devices over a cellular data channel that can experience a handoff to a WiFi channel; (b) a communication path is established between two devices over a WiFi network channel that can experience a handoff to a cellular data channel; (c) a communication path is established between two devices over a cellular data channel that can experience a handoff to one of a plurality of available WiFi networks; (d) a communication path is established between two devices over a WiFi channel that can experience a handoff to another available WiFi channel, etc.

As such, an exemplary embodiment includes a system that enable handoffs between WiFI networks and cellular data networks. An exemplary system includes a special platform 1010 that includes a processing unit and a memory unit including instructions to be executed by the processing unit. In operation, Subscriber A 1002 initiates a call to Subscriber B 1004. The special platform 1010 receives the call request and attempts to establish a communications channel between Subscriber A 1002 and Subscriber B 1004. Subscriber B 1004 may be set up or configured by the user or otherwise to define how the Subscriber B 1004 is to receive and/or place calls. For instance, Subscriber B 1004 can be set up for establishing calls over an available WiFi network if possible, and if not, default to a cellular data network. Likewise, the Subscriber B 1004 can be set up for establishing calls over a cellular data network and only switching to WiFi by user control or some other triggering event, such as a WiFi network becoming available, a particular WiFi network becoming available, after a certain period of time, in response to detecting that the minutes utilized by Subscriber B 1004 has reached a particular threshold, etc.

Assuming that Subscriber B 1004 is configured to default to a WiFi network when possible, the special platform 1010 completes the call to Subscriber B 1004 over a particular WiFi network that is available to Subscriber B 1004. The particular WiFi network may be the only WiFi network available to Subscriber B 1004 or it may be selected from any of one or more WiFi networks within the vicinity of the second subscriber device that are available. In addition, Subscriber B 1004 may be configured to give precedence to certain WiFi networks in the selection. For instance, if Subscriber B 1004 is at home and has multiple WiFi networks (i.e. one for home office, one for entertainment systems, one for home security automation systems, etc.), Subscriber B 1004 may include system settings to determine the order in which the WiFi network is selected from the available WiFi networks. Similarly, when Subscriber B 1004 is in a different environment, Subscriber B can be set up to exclude or allow certain WiFi networks to be included in a pool of Wifi networks available. As a non-limiting example, as Subscriber B 1004 commutes from home to work or vice versa, Subscriber B 1004 may be configured to exclude certain WiFi networks that are passed through during that commute.

During the communication, the particular WiFi network may become unavailable and thus require a handoff to a different communications channel. Depending on the configuration of Subscriber B 1004 and the environment in which Subscriber B exists, the handoff may be to a cellular data network or another WiFi network. Thus, in one situation, the special platform 1010 may receive a transfer to cellular data session initiation protocol (SIP) registration with a new IP address from Subscriber B 1004 when the particular WiFi network becomes unavailable. This action will result in a transition of the call between Subscriber A 1002 and Subscriber B 1004 to the cellular data network. In another situation, Subscriber B 1004 may have other WiFi networks available and as such, Subscriber B 1004 may simply transition to one of the other available WiFi networks. In yet another situation, Subscriber B 1004 may have other WiFi networks available and as such, Subscriber B 1004 may send a transfer to WiFi SIP request. In response to this the special platform 1010 can initiate a transition to one of the other available WiFi networks. In yet another situation, Subscriber B 1004 may have other WiFi networks available and as such, Subscriber B 1004 may send a transfer to WiFi SIP request identifying a particular WiFi network. In response to this the special platform 1010 can initiate a transition to the specified available WiFi network.

In the various embodiments, a WiFi fixer module can be loaded into Subscriber B 1004 to periodically check the status of all of the WiFi networks within the vicinity of Subscriber B 1004. If a call is active on a particular WiFi network at Subscriber B 1004 and the status of that particular WiFi network becomes unavailable, the WiFi fixer module an transmit a transfer to cellular data SIP registration with the new IP address to the special platform or a transfer to WiFi SIP to transition to a different WiFi network. In addition, if a call is active over a cellular data network and one or more WiFi networks become available, the WiFi fixer module can transmit a transfer to WiFi SIP request to the special platform 1010.

Thus, it will be appreciated that special platform 1010 can facilitate a transition from one WiFi network, to a cellular data network and then back to the same WiFi network or a different WiFi network. In addition, the special platform 1010 can facilitate the transition from one WiFi network to a different WiFi network. It should also be appreciated that when transferring from a cellular network or a particular WiFi network, the configuration of Subscriber B 1004 and/or a user of Subscriber B's device can participate in the selection of the destination WiFi network.

Data Analytics

Another aspect that can be incorporated into various embodiments of the invention includes a data analytics function. The data analytics function (Analytics Agent) may be implemented in hardware, software or a combination of both. The data analytics Agent utilizes a Pulse Secure VPN Client but is also capable of being implemented with an OpenVPN client or other solutions. In operation, a client, operating within a mobile device, cooperatively interacts with the analytics agent to obtain credentials to communicate to the special platform. This function can operate with or without the use of multiline or second line services. The data analytics function operates to ensure that the correct VPN is installed and if not, to direct the user to the appropriate store in order to obtain the correct VPN.

Once the correct VPN application is installed, the Analytics Agent operates to configure the VPN client with the configured policy. The policy can include credentials and VPN server details. The policy may also include a per app VPN application list.

In operation, the analytics agent will start and stop the VPN through, or based upon, the application of one or more of a variety of rules.

Figure 11:
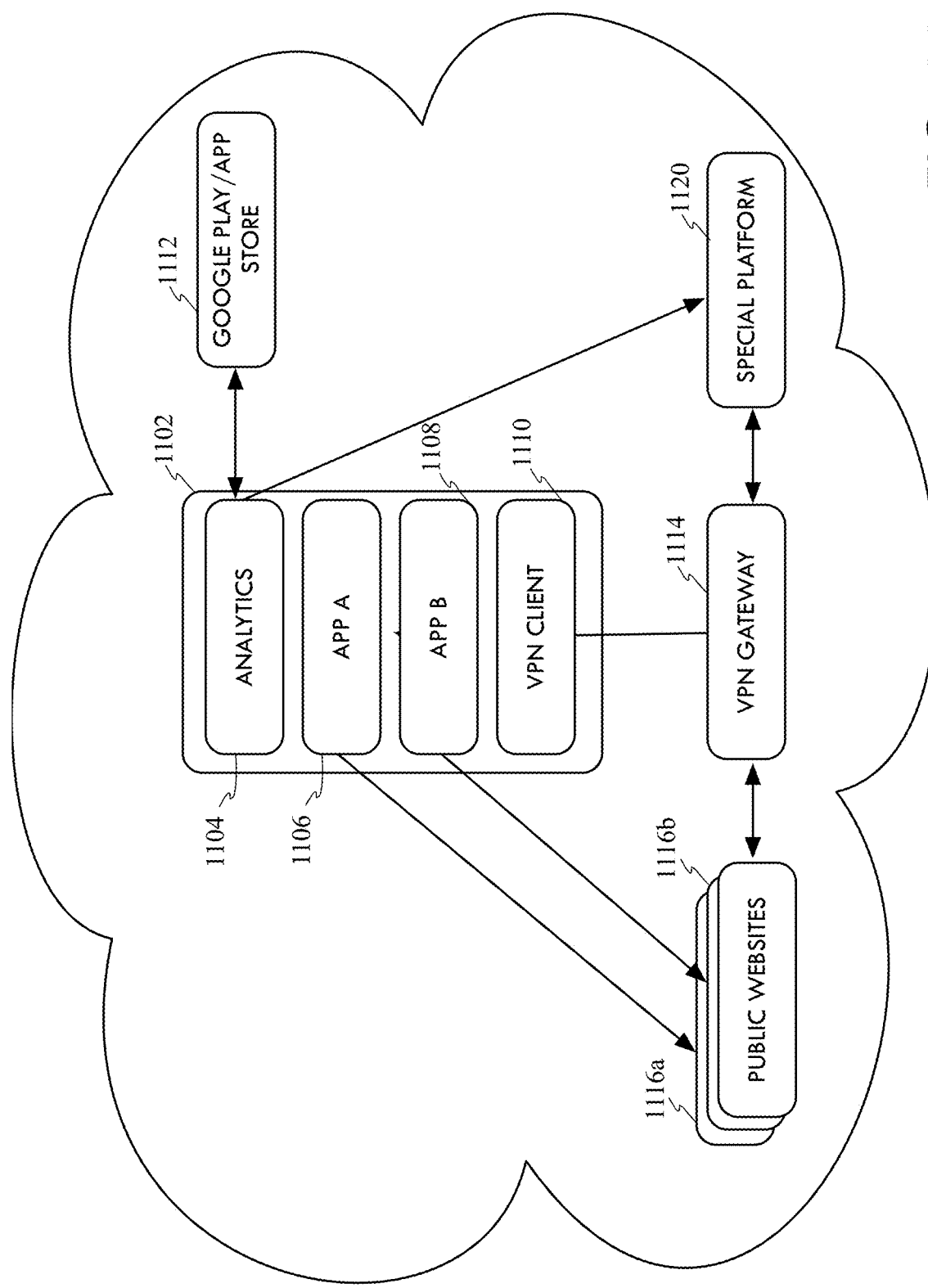
FIG. 11 is a block diagram illustrating the overall system view of components involved to provide the data analytics function without an enterprise mobility management system.

FIG. 11 is a block diagram illustrating an exemplary overview of system components or functionality involved in the provision of the data analytics function. In the illustrated embodiment, the analytics function is shown in operation without an enterprise mobility management system. A mobile platform 1102 includes the analytics agent 1104, a first application (Application A 1106), a second application (Application B 1108), and a VPN client 1110. The data analytics agent 1104 (providing an analytics function or application) is obtained by the mobile platform or device 1102 accessing the appropriate application store, such as the GOOGLE PLAY or APP STORE 1112 and downloading the data analytics agent app 1104. The data analytics agent app 1104 configures the VPN client 1110 and also starts and stops the VPN at the occurrence of network events. If the data analytics agent app 1104 determines that the VPN client 1110 is not installed, the data analytics agent app 1104 access the appropriate application store (i.e. GOOGLE PLAY or APP STORE 1112) to download the VPN client 1110.

At this point, the data analytics app 1104 can obtain a data analytics policy from the special platform 1120 for collecting analytics. In a particular embodiment, the special platform 1120 includes the Communication Application Framework Environment (CAFÉ) manufactured by Movius Interactive Corporation which is further described in the patents and the appendix incorporated above by reference. The VPN gateway 1114 sends usage information to the special platform using a protocol such as RADIUS accounting, as a non-limiting example.

In operation, APP A 1106 does not use the VPN to access a public website 1116a while APP B 1108 does use the VPN when the device 1102 uses cellular data to access public website 1116b but does not use the VPN (per configuration) when the device 1102 uses WiFi.

Figure 12:
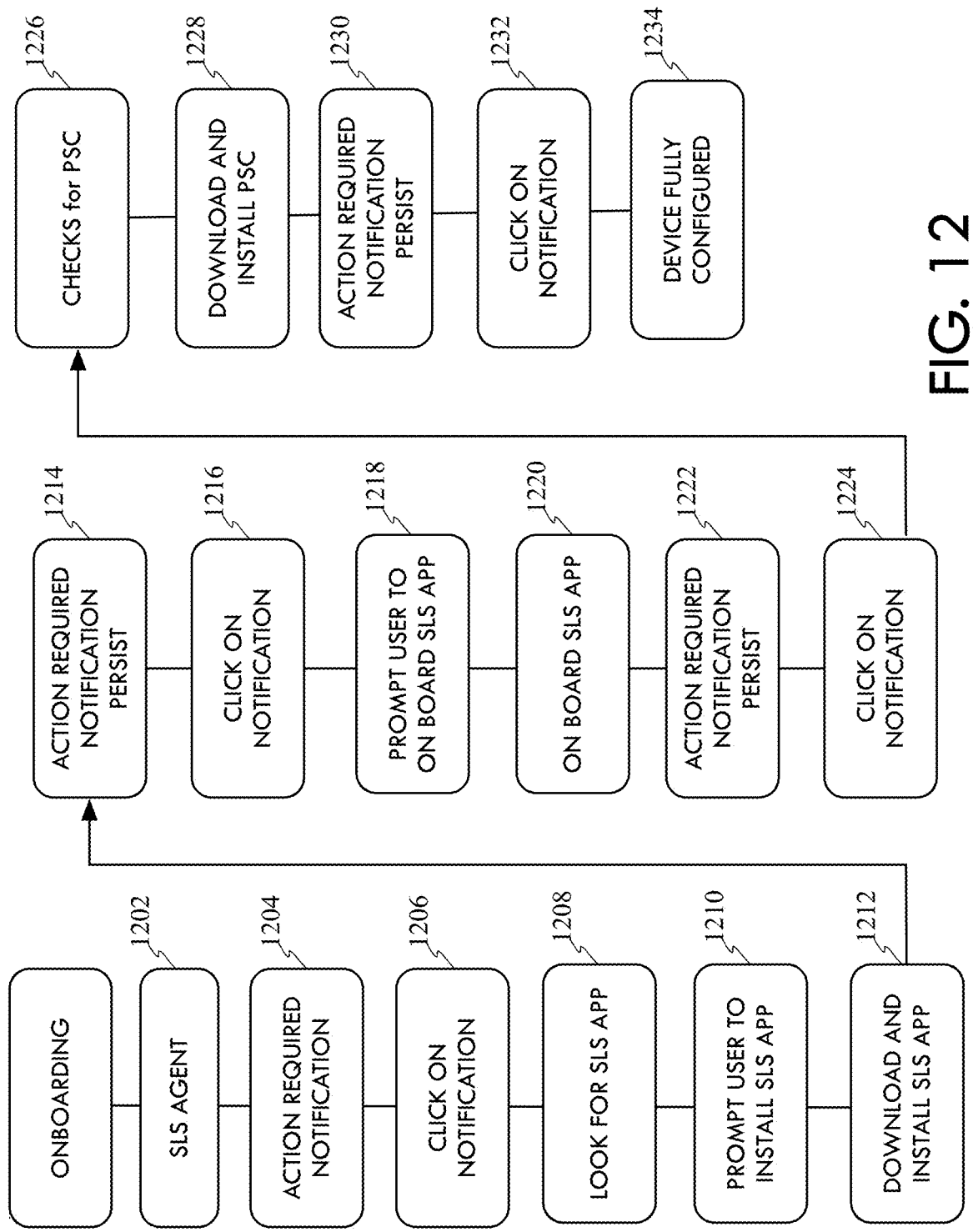
FIG. 12 is a flow diagram illustrating the exemplary steps take in an exemplary embodiment for onboarding a user with the data analytics app 1104.

FIG. 12 is a flow diagram illustrating the exemplary steps take in an exemplary embodiment for onboarding a user with the data analytics app 1104. Initially the data SLS agent is obtained from the appropriate application store such as APP STORE or GOOGLE PLAY STORE 1202 and loaded onto the device 1102. The SLS agent, when executed, then creates a notification with the message "Action Required" 1204. In response the user or subscriber should click on the notification or open the analytics application 1104 1206. The analytics application 1104 checks for an existing installation of the SLS app 1208. If it is not installed, the analytics app prompts the user to install the SLS app 1210. The user then accesses the appropriate application store (i.e GOOGLE PLAY STORE or APP STORE) to obtain and install the SLS app 1212. The "Action Required" notification continues to persist 1214 on the device 1102. If the user clicks on the notification or opens the analytics application 1104 1216, the user is prompted to onboard the SLS app 1218. The user then on boards the SLS app 1220.

The "Action Required" notification still persists at this point 1222. Next, the user or subscriber clicks on the notification or opens the analytics app 1104 1224 and checks for a Pulse Secure Client installation 1226. If the installation is not already present, the user is prompted to download and install the Pulse Secure Client 1228. The "Action Required" notification still persists at this point 1230.

The user next clicks on the notification or opens the analytics app and configures the Pulse Secure Client 1104 1232. At this point the user is notified that the device 1102 is fully configured 1234.

Once the device 1102 is fully configured, an SLS administrator can enable data analytics for the enterprise. Once data analytics are enabled, the enterprise is able to modify the whitelisted applications. The Enterprise Admin can change the VPN settings, such as selecting WiFi, Cellular or both. Further, the enterprise admin can search for whitelisted applications on the GOOGLE PLAY STORE or APP STORE. Any whitelisted applications that are installed on the device 1102 will be traced for data usage.

The SLS agent includes a client user interface. When the main user interface screen of the SLS agent is presented to the user on the user's or subscriber's device, each of the features available to the user are presented. One of the features available can be the data analytics feature. The main user interface screen may show the option of selecting the data analytics feature and it may include a state of the data analytics feature as well as any actions that may be required. Some embodiments of the analytics agent app function may require the use of enterprise mobility management EMM software. In such embodiments, an "Action Required" message appears when launching the analytics agent app function. When the user selects the Action Required prompt, the EMM software is launched, if loaded, otherwise the user is prompted to download and install the EMM software. As a non-limiting example, the EMM software may be the AirWatch product marketed by VMWARE. The AirWatch product operates to protect corporate applications and data accessed from any device on any network. Among other things, the AirWatch product includes the following features:

Mobile device management (MDM) for configuring, securing and enforcing policies on smartphones, tablets and Windows 10 PCs;

Mobile application management (MAM) for deploying, securing and enforcing policies on smartphone and tablet apps;

Secure productivity apps for email (VMware Boxer) and web browsing (AirWatch Browser);

Identity management for user-based control and security;

AirWatch Content Locker, an enterprise file sync-and-sharing (EFSS) service; and Telecom expense management.

The AirWatch EMM suite is available for on-premises deployment or as a cloud service.

Selecting the data analytics feature can cause a transition to a new interface screen that shows access code, VPN URL, VPN user and an application list. The application list may include a list of applications that are to be monitored when using mobile data (i.e., whitelisted). For instance, in embodiment in which EMM software is utilized, the mobile application management (MAM) function may require enterprise applications (i.e., applications utilized by an employee for performing work duties) to be monitored by the analytics engine to identify data usage attributable to the enterprise application. As a non-limiting example, in a bring your own device (BYOD) environment, an employee may utilize his or her mobile device for personal uses and business uses. When utilizing the device for business uses, the enterprise applications can be utilized and the data usage tracked and reported to allow the user to be reimbursed for business usage of the device.

Figures 13A, 13B, 13C:
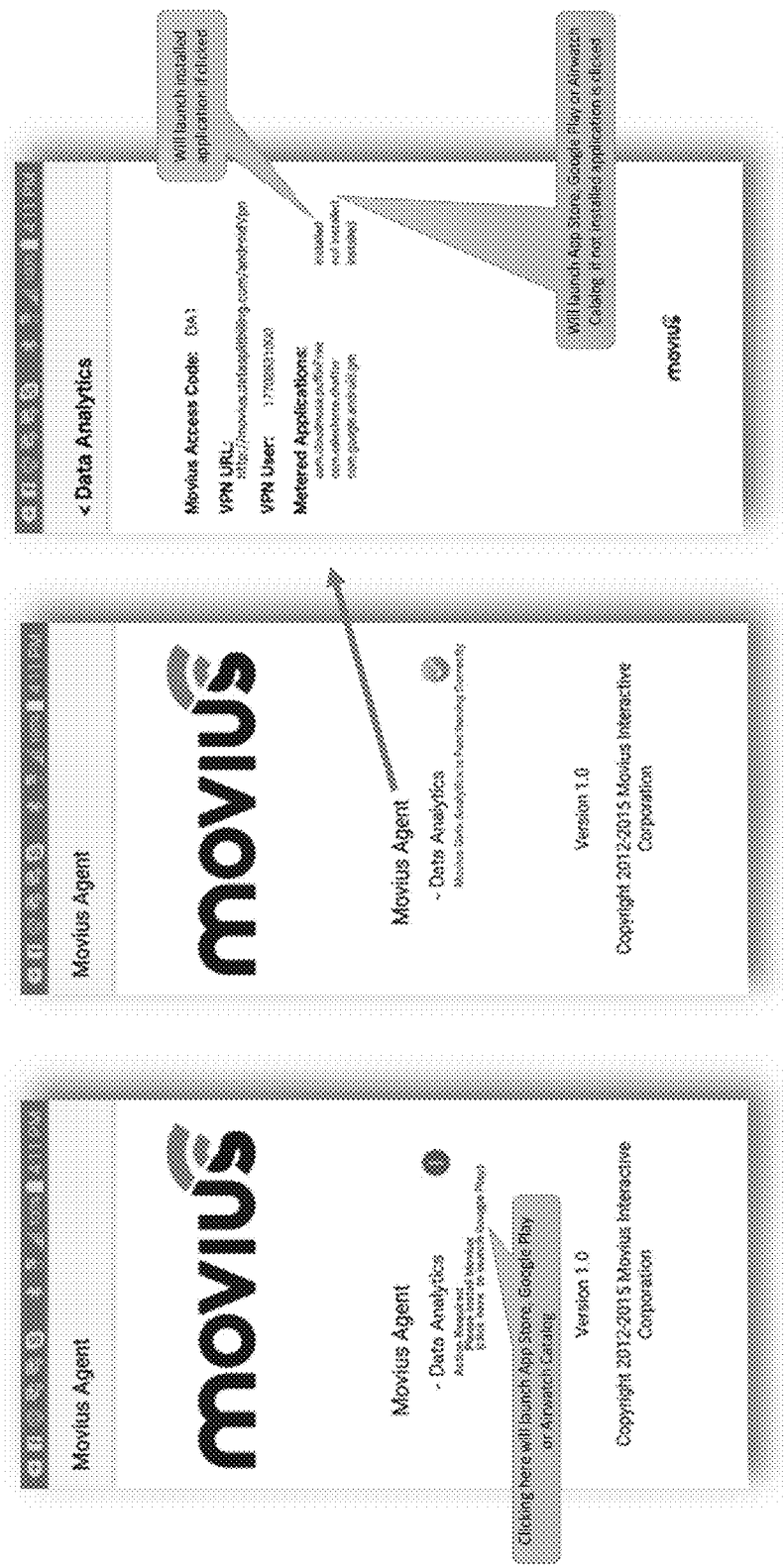
FIGS. 13A, 13B and 13C provide exemplary examples of the SLS agent interface.

For each application, the data analytics page will show if the application is installed or not. Clicking on an installed application link will launch the application. Clicking on an application link that is not installed will launch the appropriate application store (i.e., GOOGLE PLAY STORE or APP STORE) or, in applicable embodiments, will launch the AirWatch product as needed. FIGS. 13A, 13B and 13C provide exemplary examples of the SLS agent interface.

Figure 14:
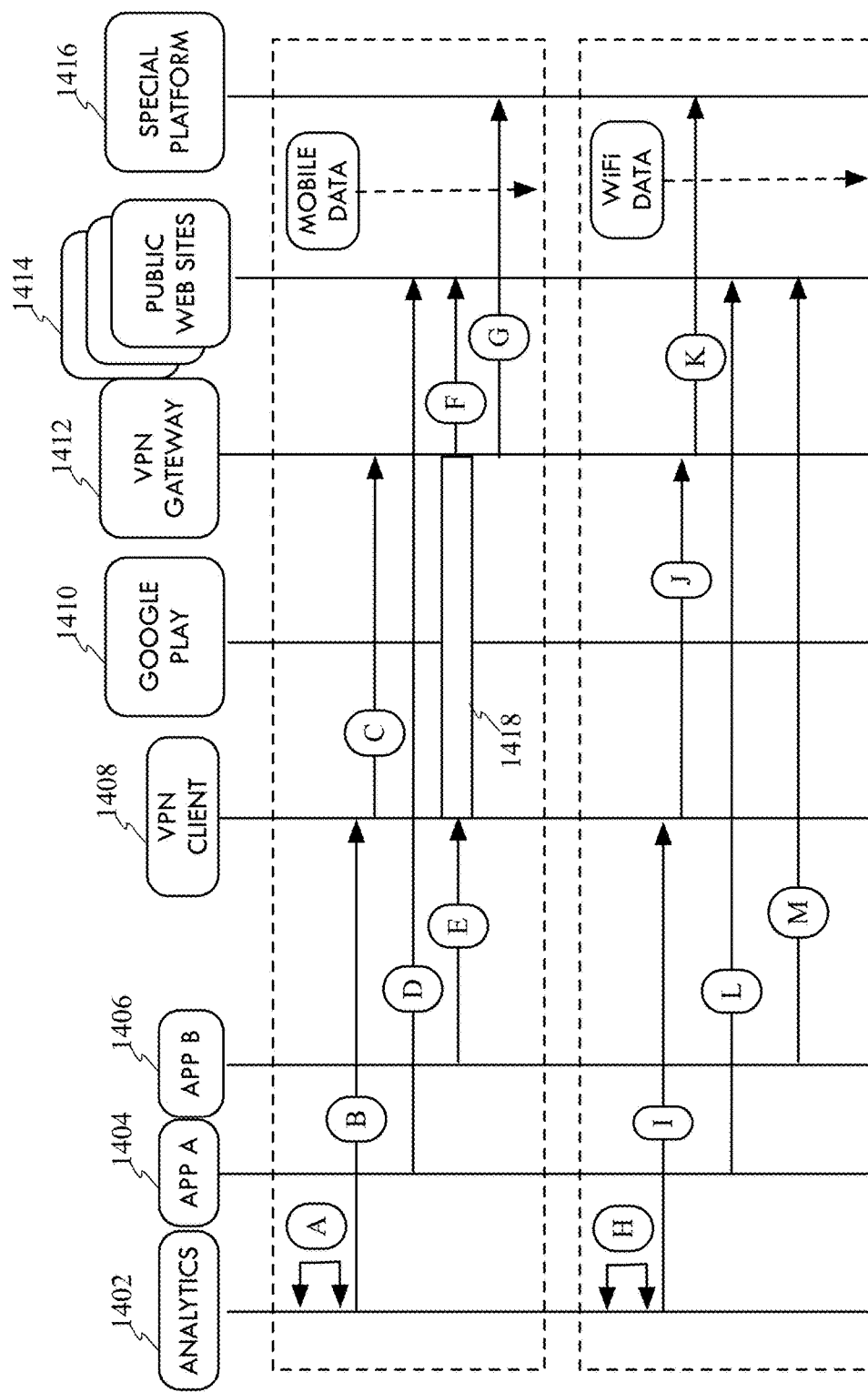
FIG. 14 is a flow diagram illustrating the flow of events between components after the setup of the analytics function is complete.

FIG. 14 is a flow diagram illustrating the flow of events between components after the setup of the analytics function is complete. Initially, the analytics application 1402 detects mobile data (A). In response to detecting mobile data (A) the analytics function initiates a VPN connection by contacting (B) the VPN client 1408 which then establishes the connection (C) to the VPN gateway 1412. In the illustrated embodiment, APP A 1404 does not utilize the VPN and so is shown as directly connected to a public web site 1414 (D). On the other hand, APP B 1406 connects to the VPN client 1408 (E) and then is connected through a VPN 1418 to the VPN gateway 1412 before accessing a public website 1414 (F). At this point, the VPN gateway 1412 can track and report usage data to the special platform 1416 (G) for the data usage of APP A 1404.

When the analytics function 1402 detects WiFi data (H), the analytics function 1402 sends a STOP VPN command to the VPN client 1408 (I). The VPN client 1408 then sends a disconnect command (J) to the VPN gateway 1412. At this point, APP A 1404 and APP B 1406 both connect directly to public web sites 1414 without going through the VPN gateway 1418 and thus, no data usage is reported by the VPN gateway for either App A 1404 or App B 1406.

Figure 15:
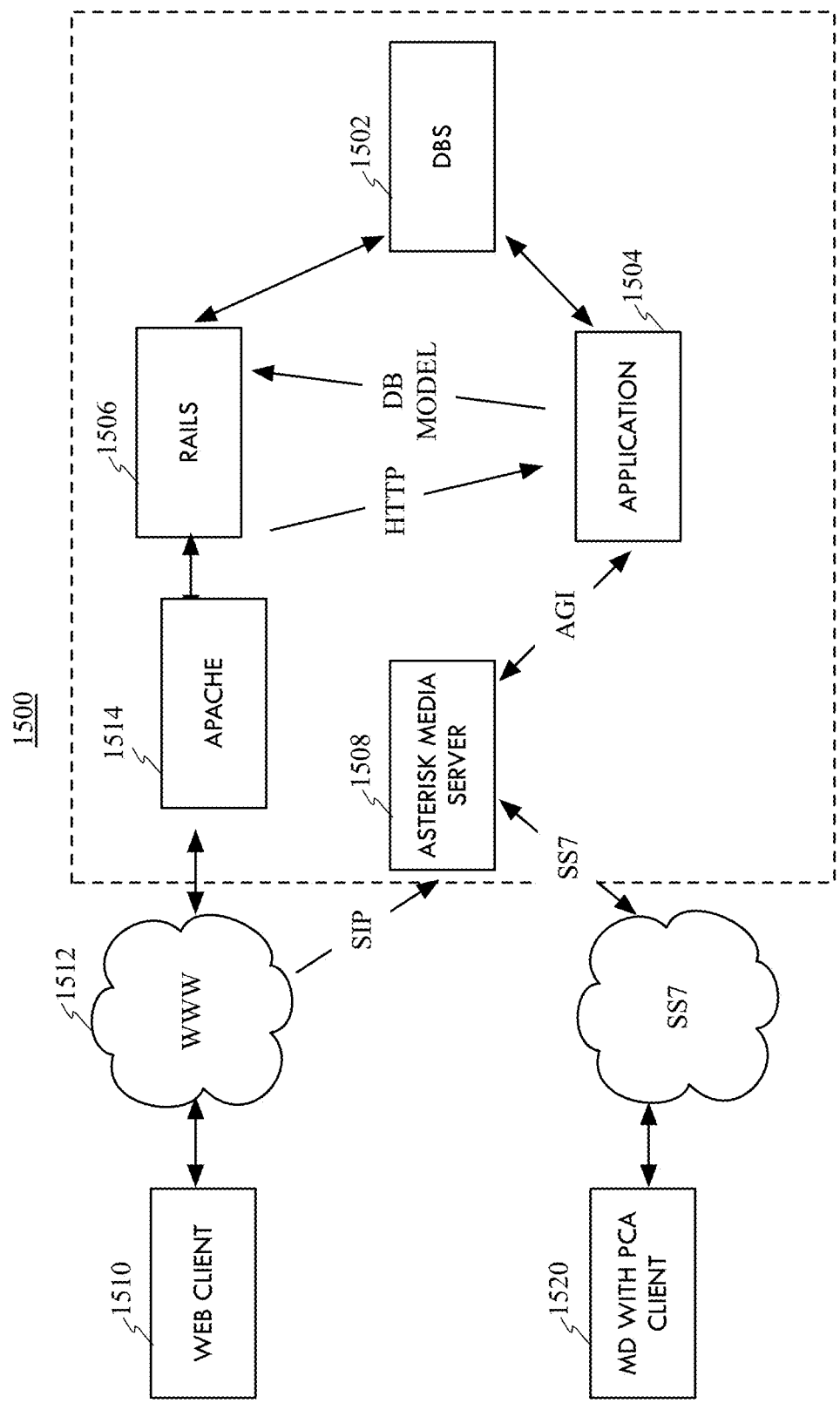
FIG. 15 is block diagram of a system architecture (i.e., Movius Common Platform or MCP) that could serve as an exemplary platform for various embodiments of the MCCP.

FIG. 15 is block diagram of a system architecture (i.e., Movius Common Platform or MCP) that could serve as an exemplary platform for various embodiments of the MCCP. The MCP 1500 is shown as including various databases 1502 are provided including Postgress (org, COS, User), Courier (mail store), Status Cache (conference, application) and Memcached (Active Record Cache). The WEB Applications 1504 are configured to pick up the data model from Rails 1506 using Active Record. Rails 1506 is a webapplication framework that includes everything needed to create database-backed web applications according to the Model-View-Controller pattern, meaning that the View-Model is responsible for exposing the data objects from the Model in such a way that those objects are easily managed and consumed. This pattern splits the view (also called the presentation) into "dumb" templates primarily responsible for inserting pre-built data in between HTML tags. The model contains the "smart" domain objects (such as Account, Product, Person, Post) that holds all the business logic and knows how to persist themselves to a database. The controller handles the incoming requests—Save New Account, Update Product and Show Post—by manipulating the model and directing data to the view.

In Rails, the model is handled by Active Record, an object-relational mapping layer which allows data to be presented from database rows as objects and embellish these data objects with business logic methods. The controller and view are handled by Action pack, which handles both layers by its two parts: Action View and Action Controller. These two layers are bundled in a single package due to their heavy interdependence. This is unlike the relationship between the Active Record and Action Pack which is far more separate. Each of these packages can be used independently outside of Rails.

A data structure that can be utilized in various embodiments can be stored in Postgress including, as an example, user tables, organizational structure, class of service, application tables, user status cache (i.e., current application state). An Asterisk media server 1508 can be utilized, which also would handle the telephony signaling. In an exemplary embodiment, the Asterisk media server is equipped with a Sangoma 802 TDM card to handle up to 8 E1/T1 Media channel spans. The Sangoma driver provides the interface into the Asterisk channel process for integration. This includes tone detection and echo cancellation. Asterisk currently provides an SS7 stack for ISUP signaling interface (libss7), part of which is used. The lower layers of the SS7 stack are handled by the SGF server.

The M3UA delivers the ISUP message to Asterisk, where the ISUP messages are captured and funneled into the User Layer of the Asterisk MTP3 stack. The M3UA Client on the Asterisk communicates with the M3UA server on the SGF.

The WEB applications 1504 run in Rails 1506 and can access telephony services through the Asterisk media server 1508 through HTTP. A courier mail store can be utilized for storing message and can hold standard MIME messages but, the data attachment may be decoupled and proxies in a NAS file system to enable easier access to the data.

As such, a Web Client 1510 interfaces to the MCP 1500 through the internet (WWW) 1512 utilizing the SIP protocol to access or interact with the Asterisk media server 1508 or the Apache 1514. A subscriber phone or mobile device (MD) 1520 interacts with the MCP 1500 though an SS7 network.

Figure 16:
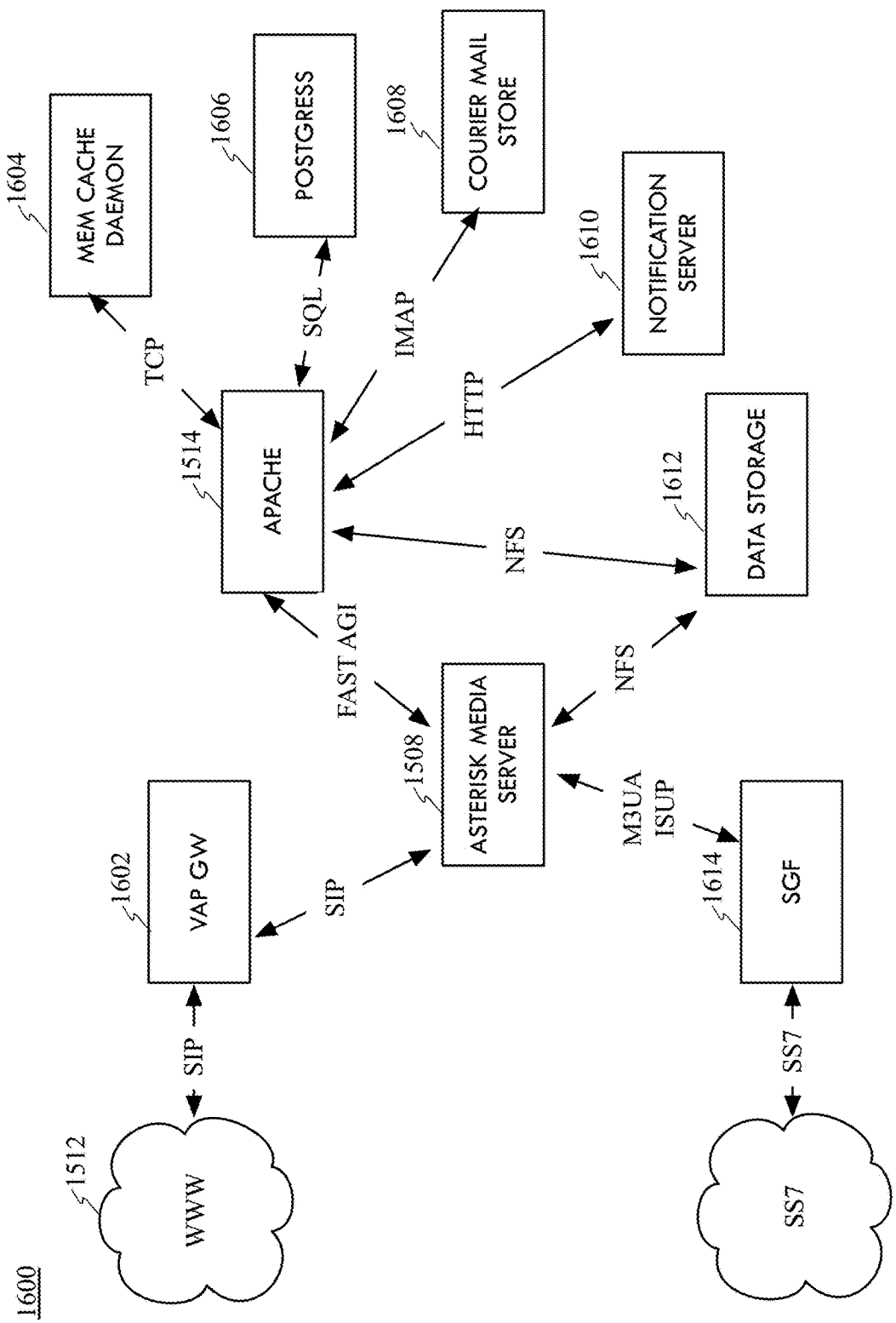
FIG. 16 is a block diagram of the system architecture of FIG. 15 illustrating further details of an exemplary telephony application framework.
Figure 17:
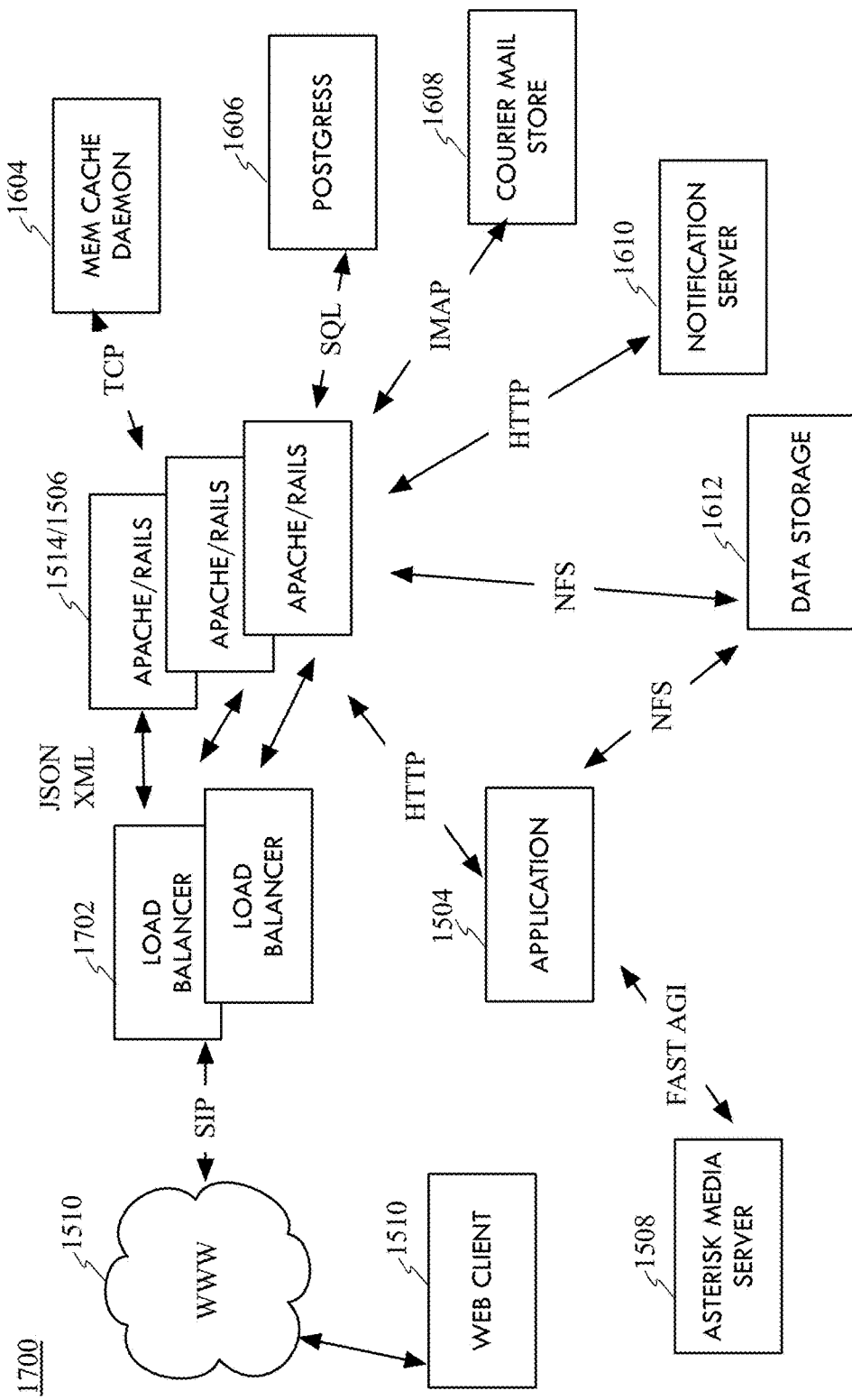
FIG. 17 is a block diagram of the system architecture of FIG. 15 illustrating further details of an exemplary web application framework.

The MCP architecture can be divided into two groups. A first group is the telephony applications, such as voice mail, which are built into the TUI building blocks as best illustrated in FIG. 16. The second group is the web controllers running on rails as best illustrated in FIG. 17. The web controllers include all components except the TUI apps. The components include a database GUI, WEB API (external API) and notification server interface. In the exemplary platform, database access models can be implemented in Rails and then migrated into the database. The Rails framework includes a process for creating, upgrading and downgrading database schema's called migration.

FIG. 16 is a block diagram of the system architecture of FIG. 15 illustrating further details of an exemplary telephony application framework. The telephony applications can run independently from the Asterisk media server. Calls are initiated via SIP or ISUP through the web 1512 and VAP gateway 1602, and spawn a channel in the Asterisk media server 1508. The Asterisk media server 1508 dialplan initiates a fast AGI connection to the application. The application session will then control the Asterisk media server to play, record and collect digits. The application will manage the databases (i.e., deposit, play, delete). A user status can be maintained by all applications in the back-end database. The mail store can house or store the MIME encoded messages (less the data attachments). These mail store can be accessed directly using any standard mail client.

FIG. 17 is a block diagram of the system architecture of FIG. 15 illustrating further details of an exemplary web application framework. The web application framework 1700 enables web applications 1504 to be served through Apache 1514 and Rails 1506. The Rails server 1506 has access to all system resources through the use of standard interfaces. The database classes can be designed in Rails so that they can be easily migrated to the Postgres database over an SQL interface. The Apache/Rails server 1514/1506 can access the Mem Cache Daemon 1604 using TCP, courier mail store 1608 using IMAP, the notification serer 1610 using HTTP, the data storage 1612 by NF S. An HTTP interface enables the TUI application 1504 to be initiated by the WEB Client over the WEB 1510 and through the load balancer 1702 and apache/Rails 1514/1506. The Asterisk operates as the media server and telephony signal handler.

The voicemail application in the telephone application framework 1600 provides at least the following high-level features and functionality:
Caller Features
Subscriber Features:
   Outbound messaging features
   Subscriber mailbox access features
   Subscriber greetings features
   Message notification features
   Incoming call response features
Statistics
Call Detail Records (CDR's)

The call flow for a caller leaving a message to a subscribe through the voicemail application can be outlined as follows:
(1) The user is switched to the Voice Messaging System (VMS) and the call presentation data is received.
(2) Call presentation data and Mailbox Type indicates that the user is a caller and not the subscriber.
(3) A greeting is played to the caller followed by a record beep tone.
(4) The caller leaves a message for the subscriber and terminates the recording by either hanging-up or a Terminate Record key press.
(5) If a key press command was used to terminate the recording, other message delivery options are presented to the caller.
(6) Call is terminated when caller hangs-up.

The call flow for a subscriber retrieving a message through the voicemail application can be outlined as follows:
(1) The user is switched to the Voice Messaging System (VMS) and the call presentation data is received.
(2) Call presentation data and Mailbox Type indicates that the user is a subscriber OR a caller.
(3) A check is made if the mailbox is suspended.
(4) A greeting is played to the caller who may choose to login at this time.
(5) At the time of login, the user is considered a Subscriber and not a Caller.
(6) Application determined by the Mailbox Type is initiated.
(7) Subscriber remains entirely within the application until the call is terminated.
(8) Call is terminated when subscriber hangs-up or issues a command to terminate the call.
(9) Any audio (message or greeting) not completely dispositioned by the subscriber before disconnect is discarded.

The MCP 1500 can be configured to collect and store statistics related to call activity. For instance, the MCP 1500 may include a statistics engine. Statistics provide a method of analyzing the performance and usage of the Voicemail Application. The following statistics can provided in exemplary embodiments as non-limiting examples:

callAttempts: A counter representing the number of all calls that were processed by the voicemail application. The calls may be counted even if they didn't result in voicemail deposits or retrievals.

hangupDueToMaxRecordingAttempts: A counter which represents the number of calls hungup by voicemail application due to maximum recording attempts on the caller message deposit menu.

hangupDueToMaxCommands: A counter which represents the number of calls hungup by voicemail application due to maximum command inputs (user key presses) on the caller message deposit menu.

callerInterfaceCalls: A counter representing the total number of calls triggering the caller interface menu.

callerMessageDeposit: A counter representing the number of messages deposited by a caller.

callerUrgentMessages: A counter representing the number of messages marked urgent by callers.

callerPrivateMessages: A counter representing the number of messages marked private by callers.

callerHangupWithoutDeposit: A counter representing the number of calls dropped by callers before a message was recorded.

callerMessageTooShort: A counter representing the number of messages which were not deposited to a user mailbox because they were too short.

callerOperatorTransfers: A counter representing the number of operator transfers initiated by callers.

callerEnteredCallbackNumber: A counter representing the number of callback numbers entered by callers.

callerToSubscriberSwitch: A counter representing the number of switches from caller menu to subscriber menu.

callerReId: A counter representing the number of caller re-ids done.

subscriberinterfaceCalls: A counter representing the number of calls triggering the subscriber interface menu.

subscriberLogins: A counter representing the number of successful logins by subscribers.

subscriberAutoLogins: A counter representing the number of successful logins without entering a password.

subscriberOperatorTransfers: A counter representing the number of operator outcalls initiated by subscribers.

subscriberReId: A counter representing the number of re-ids done by subscribers.

subscriberOutCalls: A counter representing the number of outcalls initiated by subscribers.

subscriberComposedMessages: A counter representing the number of messages composed by subscribers.

subscriberMessageDeletes: A counter representing the number of message deletions by subscribers.

subscriberMessageSaves: A counter representing the number of messages saved by subscribers.

messageWaitingNotificationCount: A counter representing the number of MWN notifications sent out.

missedCallNotificationCount: A counter representing the number of missed call notifications sent out.

messageWaitingIndicationCount: A counter representing the number of MWI events generated from the voicemail application.

mailBoxFullNotificationCount: A counter representing the number of mailbox full notifications generated by voicemail application.

userAccountSuspendCount: A counter representing the number of mailbox suspend operations triggered from the voicemail application.

userAccountAutoActivateCount: A counter representing the number of mailbox activate operations triggered from the voicemail application.

userGroupMessagesSent: A counter representing the number of group messages sent from the voicemail application.

userPasswordResetCount: A counter representing the number of password resets triggered from the voicemail application.

userAccountsDeleted: A counter representing the number of user accounts deleted from the voicemail application.

userGreetingsPlayed: A counter which represents the number of times user greetings were played.

tutorialSetup: A counter indicating a new account being setup and the tutorial being used to setup basic account parameters.

tutorialAborted: An alarm indicating a new user aborting the first time tutorial. The following parameters are available:

primaryAccountNumber—user's primary number
extension—user's extension
abortedAt—the tutorial step where the user aborted. Password change, name recording or greeting recording.

Figure 18:
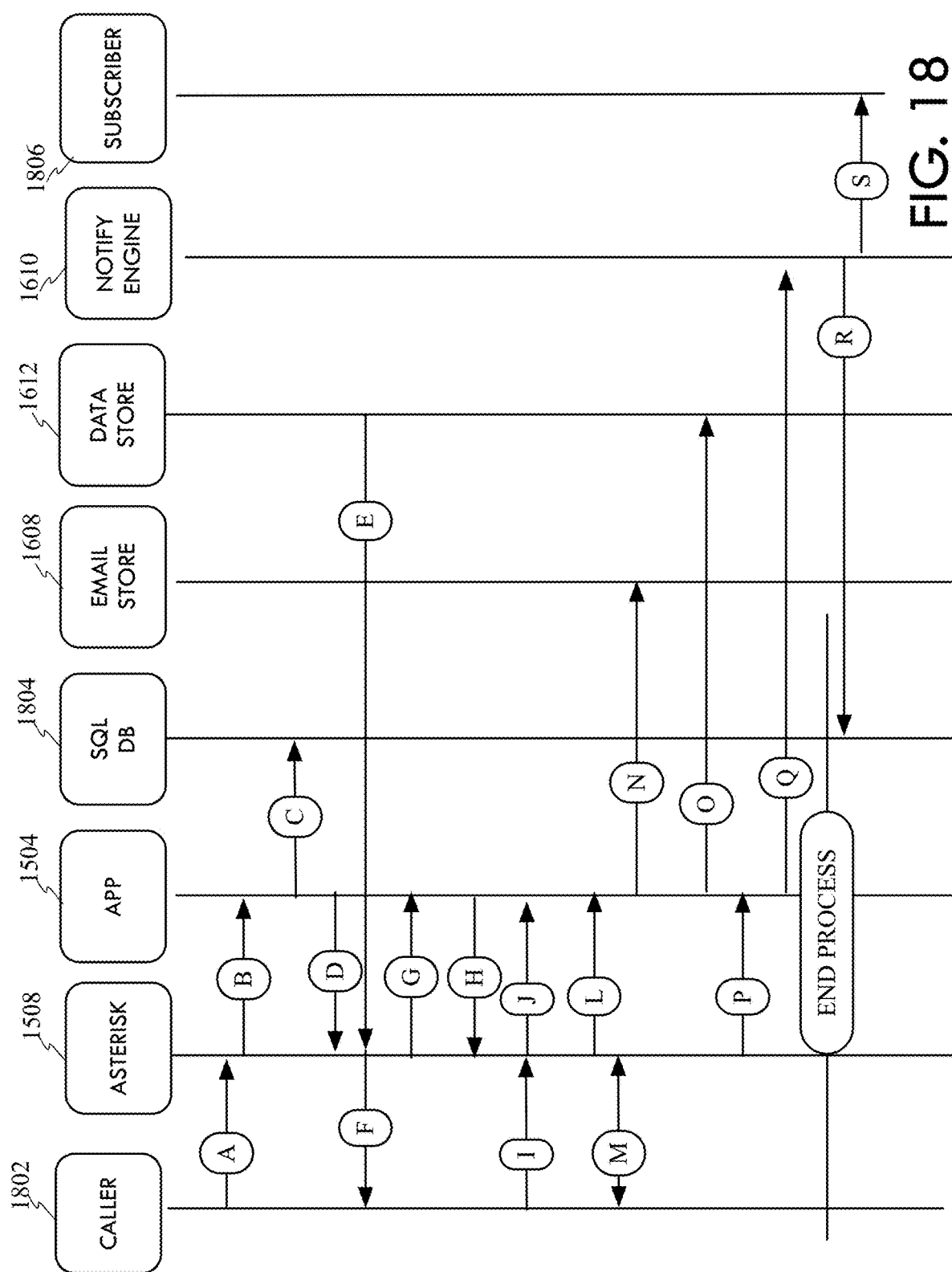
FIG. 18 is a flow diagram of the system operating to receive and provide a message from a user's perspective.

FIG. 18 is a flow diagram of the system operating to receive and provide a message from a user's perspective. Initially, caller 1802 initiates a call resulting in (A) an incoming call request via SIP or SS7 being received at the Asterisk media server 1508. The Asterisk 1508, based on the dialplan, initiates a fast AGI session with the application 1504 (B). The application 1504 obtains signaling information from Asterisk 1508 and looks up the user data in the SQL database (C). The application 1504 also response by telling Asterisk 1508 to play a greeting (D). Asterisk 1508 then spools the greeting attachment (E) from an NFS data store 1612 then plays the greeting for the caller 1802 (F). When the playback of the greening is completed the Asterisk 1508 notifies the application 1504 (G) and the application 1504 response instructing the Asterisk 1508 to record a message to a specified file name (H). Asterisk 1508 then commences to record a message from the caller 1802 (I) and then records the file into the specified file name (J). When the recording is completed, the Asterisk 1508 notifies the application 1504 (L) and the application builds a MIME file with all metadata and attachment filename and stores it in the email store 1608 through the IMAP protocol (N). At this point, the call can be terminated by either the caller 1802 or the Asterisk 1508 (M). The application 1504 continues by storing the attachment at the data store 1612 (O). The Asterisk 1508 then sends a hangup message to the application 1504 (P). The application 1504 then commences to send an MWI event to the notification engine 1610 (Q), which in essence is the completion of the process. However, the notification engine 1610 does proceed to allow the notification method to be stored in the SQL database 1804 (R) and then sends a notify message to the subscriber 1806 (S).

FIG. 19 is an exemplary flow diagram illustrating the operation of an exemplary MCCP in enabling cross-platform communication. In general, the system enables communication from a first communication element 1902 to be established with a second communication element 1904 over a preferred communication channel for the second communication element 1904. The system includes a first server 1906 that provides the services of a multi-channel communication platform and includes a processing unit and memory, wherein the operations of the first server 1906 and the MCCP are enabled by instructions within the memory and hardware within the first server that in cooperation with the processing unit are enabled. The system also includes a second server 1908 that provides a gateway to interface the first communication element 1902 to the multi-channel communications platform 1906. The second server 1908 also includes a processing unit and memory. The operations of the second server 1908 and the gateway are enabled by instructions within the memory and hardware within the second server 1908 that in cooperation with the processing unit are enabled. Further, a plurality of application program interfaces (APIs) 1910, 1912 and 1914 are provided. While the illustrated embodiment shows only 3 APIs, it should be appreciated the fewer or more APIs can be included. Each of the APIs are configured to communicatively interface the multi-channel communications platform to a particular communication channel (i.e. WECHAT, WHATSAPP, ZOOM, etc.).

In operation, a user at the first communication element 1902 can initiate a communication to a user the second communication element 1904 (A). The communication is received at the gateway 1908 and traverses over a first communication channel (depicted by a dashed line). The communication initiation includes a destination address of a second communication element 1904 (i.e., a second line service number assigned or associated with the second communication element 1904).

Utilizing the destination address and the identity of the first communication element 1902 and first communication channel as search elements, the gateway 1908 accesses a data store 1920 (B) to obtain information that identifies a desired or preferred second communication channel utilized by the second communication element 1904 (C). The gateway 1908 then forwards the communication from the first communication element 1902 to the multi-channel communications platform 1906 along with the identification of the second communication channel and destination address of the second communication element 1904 (D).

The multi-channel communication platform 1906 receives the forwarded communication from the gateway and utilizing the received information, selects an appropriate API from the plurality of APIs that is compatible with the identified second communication channel. In the illustrated embodiment, API 2 1912 is selected by the MCCP 1906. The communication initiation from the first communication element 1902 is then directed to the second communication element 1904 over a second communication channel (F) depicted by a dotted line. At this point, a communications channel between the first communication element 1902 and the second communications element 1904 is established (G)(H)(I), wherein communications from the first communication element 1902 to the second communication element 1904 flow through the gateway 1908, the MCCP 1906 and the API 1912. Further, communications from the second communication element 1904 to first communication element 1902 (J)(K)(L) flow through the API 1912, MCCP 1906 and gateway 1908.

FIG. 20 is a functional block diagram of the components of an exemplary embodiment of system or sub-system operating as a controller or processor 2000 that could be used in various embodiments of the disclosure for controlling aspects of the various embodiments. FIG. 20 could server as the backbone or platform for any of the components, systems or devices presented herein, including but not limited to servers, mobile devices, computers, subscriber devices, networked devices, etc. It will be appreciated that not all of the components illustrated in FIG. 20 are required in all embodiments of the activity monitor but, each of the components are presented and described in conjunction with FIG. 20 to provide a complete and overall understanding of the components. The controller can include a general computing platform 2000 illustrated as including a processor/memory device 2002/2004 that may be integrated with each other or, communicatively connected over a bus or similar interface 2006. The processor 2002 can be a variety of processor types including microprocessors, micro-controllers, programmable arrays, custom IC's etc. and may also include single or multiple processors with or without accelerators or the like. The memory element of 2004 may include a variety of structures, including but not limited to RAM, ROM, magnetic media, optical media, bubble memory, FLASH memory, EPROM, EEPROM, etc. The processor 2002, or other components in the controller may also provide components such as a real-time clock, analog to digital convertors, digital to analog convertors, etc. The processor 2002 also interfaces to a variety of elements including a control interface 2012, a display adapter 2008, an audio adapter 2010, and network/device interface 2014. The control interface 2012 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 2008 can be used to drive a variety of alert elements 2016, such as display devices including an LED display, LCD display, one or more LEDs or other display devices. The audio adapter 2010 interfaces to and drives another alert element 2018, such as a speaker or speaker system, buzzer, bell, etc. The network/interface 2014 may interface to a network 2020 which may be any type of network including, but not limited to the Internet, a global network, a wide area network, a local area network, a wired network, a wireless network or any other network type including hybrids. Through the network 2020, or even directly, the controller 2000 can interface to other devices or computing platforms such as one or more servers 2022 and/or third party systems 2024. A battery or power source provides power for the controller 2000.

Other details of the MCP and operation thereof can be obtained in Appendix A and Appendix B, incorporated above by reference and included with this application.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system to enable cross-platform integration comprising:
   a first server including a processing unit and memory and providing a multi-channel communications platform;
   a second server including a processing unit and memory and providing a gateway that interfaces a first communication element using a first communication channel to the multi-channel communications platform on the first server;
   a plurality of application program interfaces (APIs), each of the APIs configured to communicatively interface the multi-channel communications platform to a particular communication channel;
   the gateway, comprising software instructions stored on the server that when executed by the second server are configured to perform operations of:
      receiving a communication from the first communication element over the first communication channel, the communication including a destination address of a second communication element;
      using the destination address of the second communication element and an identity of the first communication element and the first communication channel as search elements, access a data source to identify the second communication channel utilized by the second communication element; and
      forward the communication from the first communication element to the multi-channel communications platform along with the identification of the second communication channel and the destination address of the second communications element;
   the multi-channel communication platform, comprising software instructions stored on the server that when executed by the server are configured to operate by:
      receiving the forwarded communication from the gateway;
      selecting an API from the plurality of APIs that is compatible with the second communication channel; and
      sending the forwarded communication through the selected API to the second communication channel of the second communication element.

2. The system of claim 1, wherein the gateway is further operative to receive a communication from the second communication element identifying the destination address of the second communication element and the preferred second communication channel of the second communication element.

3. The system of claim 2, wherein the second communication element includes a WHATSAPP application and the selected API is a WHATSAPP API that utilizes webhooks to post communications received to WHATSAPP docker containers for communicating with a WHATSAPP server that delivers communications to the WHATSAPP application on the second communication element.

4. The system of claim 2, wherein the second communication element includes a WECHAT application and the selected API is a WECHAT API that utilizes webhooks to post communications received to a WECHAT server that delivers communications to the WECHAT application on the second communication element.

5. The system of claim 2, wherein the first communication element is a multi-line enabled smart phone and the destination address is a reserved second line number and further, the gateway is configured to recognize the reserved second line number as identifying the second communication channel of the second communication element.

6. The system of claim 1, wherein the second communication element includes a WHATSAPP application and the selected API is a WHATSAPP API that utilizes webhooks to post communications received to WHATSAPP docker containers for communicating with a WHATSAPP server that delivers communications to the WHATSAPP application on the second communication element.

7. The system of claim 1, wherein the second communication element includes a WECHAT application and the selected API is a WECHAT API that utilizes webhooks to post communications received to a WECHAT server that delivers communications to the WECHAT application on the second communication element.

8. The system of claim 1, wherein the first communication element is a multi-line enabled smart phone and the destination address is a reserved second line number and further, the gateway is configured to recognize the reserved second line number as identifying the second communication channel of the second communication element.

9. The system of claim 1, wherein the first communication element is a multi-line service enabled internet of things (IOT) device.

10. The system of claim 1, wherein the first communication element is a multi-line service enable customer relationship management (CRM) system.

11. A method to enable cross-platform integration between a first communication element utilizing a first communication channel and a second communication element utilizing a second communication channel, the method comprising actions of:
a gateway receiving a communication from the first communication element over the first communication channel, the communication including a destination address of the second communication element;
the gateway identifying the second communication channel utilized by the second communication element based at least in part on the destination address of the second communication element; and
the gateway forwarding the communication from the first communication element to a multi-channel communications platform along with the identification of the second communication channel and the destination address of the second communication element;
the multi-channel communication platform, receiving the forwarded communication from the gateway;
the multi-channel communications platform selecting an API from a plurality of APIs that is compatible with the second communication channel; and
the multi-channel communications platform sending the communication through the selected API to the second communication channel of the second communication element.

12. The method of claim 11, further comprising the action of the gateway receiving a communication from the second communication element identifying the destination address of the second communication element and the preferred second communication channel of the second communication element.

13. The method of claim 12, wherein the second communication element includes a WHATSAPP application and the selected API is a WHATSAPP API, and further the multi-channel communications platform sends the communication by utilizing webhooks to post communications received to WHATSAPP docker containers for communicating with a WHATSAPP server that delivers communications to the WHATSAPP application on the second communication element.

14. The method of claim 12, wherein the second communication element includes a WECHAT application and the selected API is a WECHAT API, and further the multi-channel communications platform sends the communication by utilizing webhooks to post communications received to a WECHAT server that delivers communications to the WECHAT application on the second communication element.

15. The method of claim 12, wherein the first communication element is a multi-line enabled smart phone and the destination address is a reserved second line number and further, the gateway recognizes the reserved second line number as identifying the second communication channel of the second communication element.

16. The method of claim 11, wherein the second communication element includes a WHATSAPP application and the selected API is a WHATSAPP API, and further the multi-channel communications platform sends the communication by utilizing webhooks to post communications received to WHATSAPP docker containers for communicating with a WHATSAPP server that delivers communications to the WHATSAPP application on the second communication element.

17. The method of claim 11, wherein the second communication element includes a WECHAT application and the selected API is a WECHAT API, and further the multi-channel communications platform sends the communication by utilizing webhooks to post communications received to a WECHAT server that delivers communications to the WECHAT application on the second communication element.

18. The method of claim 11, wherein the first communication element is a multi-line enabled smart phone and the destination address is a reserved second line number and further, the gateway recognizes the reserved second line number as identifying the second communication channel of the second communication element.

19. The method of claim 11, wherein the first communication element is a multi-line service enabled internet of things (IOT) device and further, the gateway recognizes the call from a multi-line number.

20. The method of claim 11, wherein the first communication element is a multi-line service enable customer relationship management (CRM) system and further, the gateway recognizes the call from a multi-line number.

* * * * *